(12) United States Patent
Fujimura et al.

(10) Patent No.: US 8,130,296 B2
(45) Date of Patent: Mar. 6, 2012

(54) SOLID-STATE IMAGE PICKUP APPARATUS AND IMAGE PICKUP SYSTEM

(75) Inventors: Masaru Fujimura, Sagamihara (JP); Tomoyuki Noda, Kawasaki (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/558,330

(22) Filed: Sep. 11, 2009

(65) Prior Publication Data
US 2010/0231773 A1    Sep. 16, 2010

(30) Foreign Application Priority Data
Sep. 19, 2008   (JP) .................................. 2008-241013

(51) Int. Cl.
*H04N 3/14* (2006.01)
(52) U.S. Cl. ........ 348/294; 348/300; 348/301; 348/308; 250/208.1
(58) Field of Classification Search ................. 348/220.1
See application file for complete search history.

(56) References Cited

U.S. PATENT DOCUMENTS

| | | | |
|---|---|---|---|
| 7,379,109 B2* | 5/2008 | Masuyama et al. ........... | 348/308 |
| 7,379,709 B2 | 5/2008 | Sun et al. | |
| 2002/0186312 A1* | 12/2002 | Stark ............................. | 348/302 |
| 2004/0246354 A1* | 12/2004 | Yang et al. .................... | 348/308 |
| 2005/0179795 A1* | 8/2005 | Funatsu et al. ................ | 348/302 |
| 2006/0077273 A1* | 4/2006 | Lee et al. ....................... | 348/308 |
| 2006/0132634 A1 | 6/2006 | Kudoh | |
| 2006/0243883 A1* | 11/2006 | Yahazu et al. ............. | 250/208.1 |

FOREIGN PATENT DOCUMENTS

| | | |
|---|---|---|
| EP | 1460832 A2 | 9/2004 |
| JP | 2004-304771 A | 10/2004 |
| JP | 2006-174325 A | 6/2006 |

* cited by examiner

*Primary Examiner* — Anthony J Daniels
(74) *Attorney, Agent, or Firm* — Canon USA Inc. IP Division

(57) ABSTRACT

A solid-state image pickup apparatus includes a reading unit having a plurality of pixels connected thereto, holding signals from the pixels, and a control unit capable of controlling operations of the pixels and reading unit. The control unit controls the pixels and reading unit in a first operation mode without addition, in a second operation mode in which signals from aa of the pixels are added, aa being an integer greater than one, and in a third operation mode in which signals from bb of the pixels are added, bb being an integer greater than aa. The reading unit includes a holding unit having a capacitance value of C, and the holding unit includes a first capacitor having a capacitance value of C/bb and a second capacitor having a capacitance value of C/p, p being a common multiple of aa and bb.

8 Claims, 16 Drawing Sheets

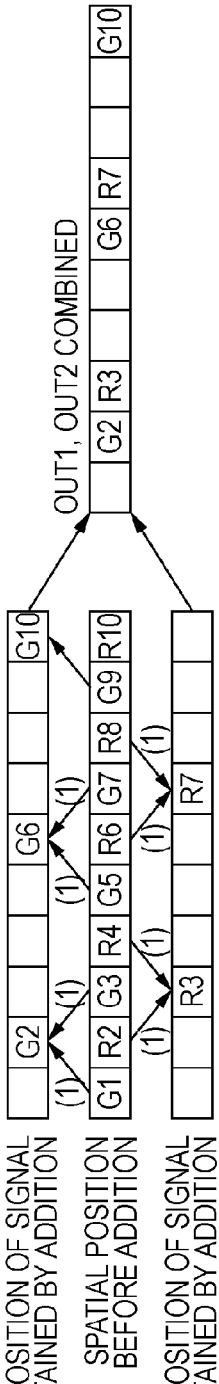
FIG. 7A
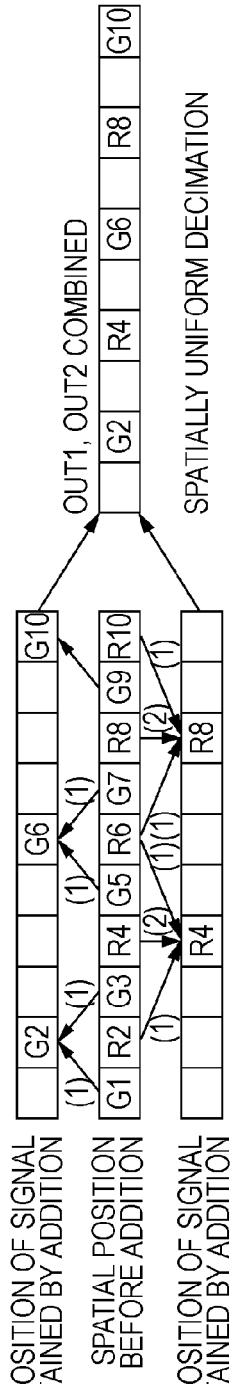
FIG. 7B
FIG. 7C

SOLID-STATE IMAGE PICKUP APPARATUS AND IMAGE PICKUP SYSTEM

BACKGROUND OF THE INVENTION

1. Field of the Invention

The present invention relates to a solid-state image pickup apparatus, and in particular to a solid-state image pickup apparatus that is capable of adding signals from pixels.

2. Description of the Related Art

In recent years, solid-state image pickup apparatuses have been used in increasingly wide application areas and are also used in, for example, digital still cameras (hereinafter called DSCs). There has been active competition in DSCs from the view point of increasing resolution by increasing the number of pixels. There exist products with a resolution higher than ten million pixels. In addition to higher resolution, a movie function is also required. For instance, there exist products capable of outputting VGA size data (640×480 pixels) at a rate of 30 frames per second (30 fps). Demand for higher output rates is expected.

In an operation mode which requires a high output rate, an operation called pixel addition is known. Pixel addition allows the number of signals output from a solid-state image pickup apparatus to be decreased by adding signals from a plurality of pixels, while suppressing degradation of image quality.

Japanese Patent Laid-Open No. 2004-304771 discloses a technique that realizes pixel addition in a direction along a column. FIG. 16 is FIG. 2 of Japanese Patent Laid-Open No. 2004-304771, showing a signal processing unit corresponding to pixels of two columns. Here, reference numerals have been changed for ease of description. In FIG. 16, reference numerals 1200a to 1200c denote sampling capacitors, reference numeral 1570 denotes a horizontal signal line, reference numeral 1210 denotes a horizontal signal line capacitor, reference numeral 1600 denotes sample hold transistors, reference numeral 1610 denotes clamp capacitors, and reference numerals 1630a to 1630c denote sampling transistors. Reference numeral 1640 denotes clamp transistors, and reference numeral 1650 denotes column selection transistors. In FIG. 16, one column is provided with the three sampling capacitors 1200a to 1200c connected in parallel, which are independently selectable by the sampling transistors 1630a to 1630c.

In Japanese Patent Laid-Open No. 2004-304771, when signals from pixels of three rows provided in the same column are to be added, the three sampling capacitors 1200a to 1200c are first made to hold signals of respective rows sequentially. Subsequently, the signals held in the sampling transistors 1630a to 1630c are added by turning on the sampling transistors 1630a to 1630c at the same time. Then, when the column selection transistor 1650 is turned on, the signal corresponding to the sum of the three rows is read via a horizontal signal line 1570. At this time a gain G1 by which a signal read via the horizontal signal line 1570 is to be multiplied is given by the following, letting Csp/3 be the capacitance value of the respective capacitors 1200a to 1200c, and Ccom be the capacitance value of the horizontal signal line capacitor 1210.

$$G1=(Csp/3+Csp/3+Csp/3)/(Csp/3+Csp/3+Csp/3+Ccom)=Csp/(Csp+Ccom) \quad (1)$$

It is disclosed in Japanese Patent Laid-Open No. 2004-304771 that addition of two rows is performed in the case where four sampling capacitors are connected in parallel. As such a method, Japanese Patent Laid-Open No. 2004-304771 discloses a method in which a signal voltage of each row is stored in two sampling capacitors.

Thus, when two-row addition is to be performed, all the sampling capacitors can be utilized in the case where the sampling capacitors are provided in a number which is a multiple of two (four in the above example). However, the following case is not considered: the case where the sampling capacitors are provided in a number which is not a multiple of the number of rows to be added, specifically, when addition of two rows is to be performed in the case where three sampling capacitors are provided.

SUMMARY OF THE INVENTION

The present invention advantageously provides sampling capacitors in a solid-state image pickup apparatus having a plurality of addition modes for adding signals of a different number of pixels.

A solid-state image pickup apparatus according to an aspect of the present embodiment includes a plurality of pixels, a reading unit to which the plurality of the pixels are connected and which holds signals from the pixels, and a control unit capable of controlling operations of the plurality of the pixels and the reading unit. The control unit controls the plurality of the pixels and the reading unit in a first operation mode in which addition is not performed, in a second operation mode in which signals from aa of the plurality of the pixels are added, aa being an integer greater than one, and in a third operation mode in which signals from bb of the plurality of the pixels are added, bb being an integer greater than aa. The reading unit includes a holding unit having a capacitance value of C. The holding unit includes a first capacitor having a capacitance value of C/bb and a second capacitor having a capacitance value of C/p, p being a common multiple of aa and bb. The control unit, in the second operation mode, controls the first and second capacitors such that groups each constituted of one of the first capacitors and more than one of the second capacitors or constituted of a plurality of the second capacitors each have a capacitance value of C/aa, and the control unit causes the groups to each hold the respective signal from the pixel. The control unit, in the third operation mode, causes groups each constituted of p/bb of the second capacitors to each hold the respective signal from the pixel and causes the first capacitors to each hold the respective signal from the pixel.

According to the present invention, it is possible to advantageously provide sampling capacitors in a solid-state image pickup apparatus having a plurality of addition modes for adding signals of a different number of pixels.

Further features of the present invention will become apparent from the following description of exemplary embodiments with reference to the attached drawings.

BRIEF DESCRIPTION OF THE DRAWINGS

FIG. 7 is an illustration showing an example configuration of a spatial position of a signal and a color filter array according to the second embodiment.

DESCRIPTION OF THE EMBODIMENTS

Hereinafter, exemplary embodiments according to the present invention are described.

Generally, "averaging" and "addition" of signals are considered to have the same meaning. In the description of the following embodiments, although "averaging" and "addition of charges" are distinguished, these are generally referred to as pixel addition.

Figure 16:
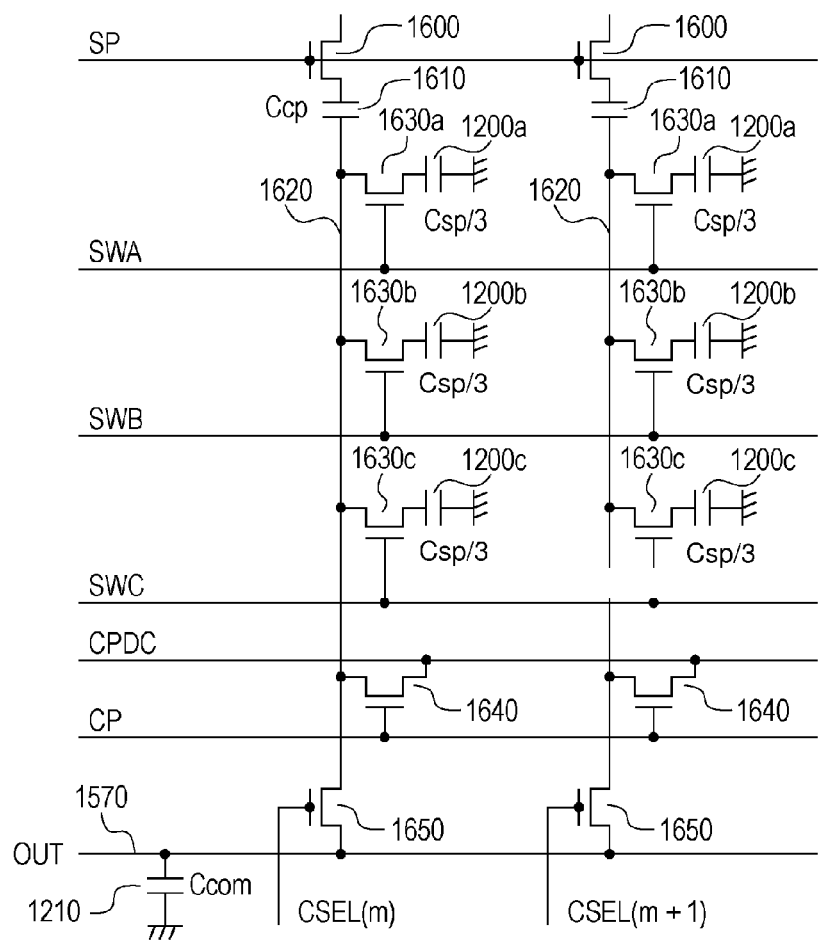
FIG. 16 is the circuit configuration diagram of the signal processing unit according to Japanese Patent Laid-Open No. 2004-304771.

Before the embodiments according to the present invention are explained, issues that arise in the solid-state image pickup apparatus disclosed in Japanese Patent Laid-Open No. 2004-304771 will be explained. For instance, suppose that a solid-state image pickup apparatus having the signal processing circuit shown in FIG. 16 has a two-row addition mode in which signals from pixels of two rows are added and a three-row addition mode in which signals from pixels of three rows are added. The three-row addition mode can be realized by the operation explained above. The following method may be considered as a method to realize the two-row addition mode using this signal processing circuit. First, the sampling capacitors 1200$a$ are caused to hold signals from the pixels of the first row, and then the sampling capacitors 1200$b$ are caused to hold signals from the pixels of the second row. Subsequently, by turning on the sampling transistors 1630$a$ and 1630$b$ at the same time, the signals held in the sampling capacitors 1200$a$ and 1200$b$ are added, and the signals obtained by the addition are read by the horizontal signal line 1570 without connecting the sampling capacitors 1200$c$ which do not hold signals. In this case, a gain G2 by which the signals read by the horizontal signal line 1570 is to be multiplied is given by the following.

$$G2=(Csp/3+Csp/3)/(Csp/3+Csp/3+Ccom) \qquad (2)$$

The ratio of G2 and G1 is given by the following, using Equations (1) and (2).

$$G2/G1=\{2(Csp+Ccom)\}/\{2Csp+3Ccom\}<1 \qquad (3)$$

Thus, the gain for the two-row addition mode is lower than the gain for the three-row addition mode. The decrease in gain means a decrease in the amplitude of the signal obtained at an output OUT, causing a decrease in the ratio of signal and noise, namely, a S/N ratio. The decrease in the S/N ratio causes worsening of a low light intensity limit, which indicates a lower limit of light intensity at which photographing of a low light intensity object is allowed while keeping a predetermined S/N ratio. As can be seen from the above equation, the capacitance values of the sampling capacitors need to be increased in order to suppress the decrease in gain in the pixel addition operation; however, this will cause the area of the chip of a solid-state image pickup apparatus to increase. When the capacitance values of the respective sampling capacitors 1200 are increased, the decrease in gain in reading of signals from the sampling capacitors 1200 to be output to the horizontal signal line 1570 can be suppressed; however, since the sampling capacitors 1200$c$ are not utilized in the two-row addition mode, the gain for the two-row addition mode becomes lower than for the three-row addition mode.

A first embodiment according to the present embodiment will be explained taking as an example a solid-state image pickup apparatus which operates in the following three operation modes: a first operation mode in which all pixels are read, a second operation mode which is a two-row addition mode, and a third operation mode which is a three-row addition mode. For ease of understanding, a monochrome solid-state image pickup apparatus is assumed.

Figure 1:
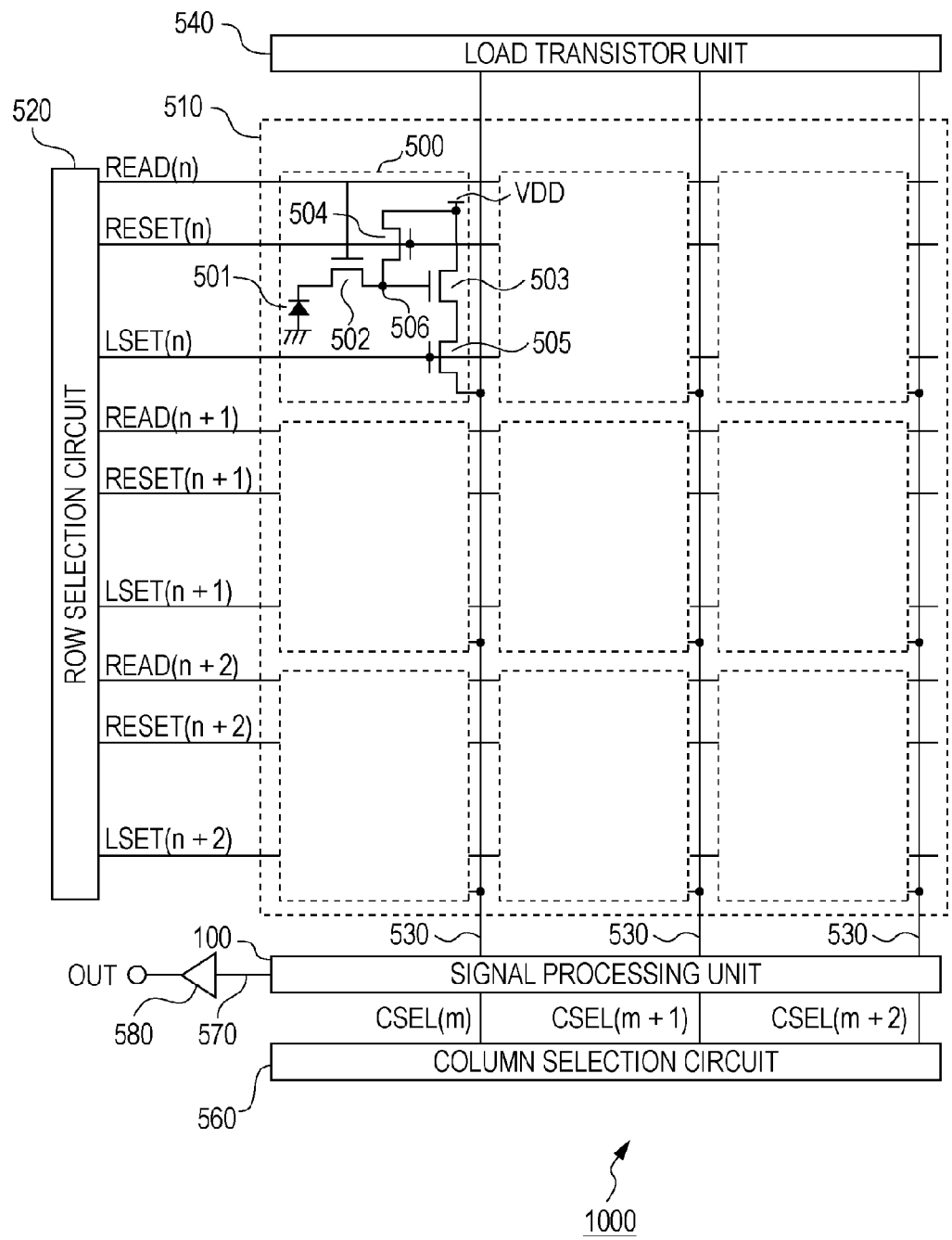
FIG. 1 is an illustration showing a schematic configuration of a solid-state image pickup apparatus according to an embodiment of the present invention.

FIG. 1 shows a schematic configuration of a solid-state image pickup apparatus according to the first embodiment of the present invention. Pixels 500 are arranged in a matrix in a pixel area 510. Here a pixel area having three rows×three columns is shown; however, this does not limit the size of the pixel area. In the respective pixels 500, signals from the pixels 500 are output to respective first vertical signal lines 530 by being driven by, for example, signals READ, RESET, and LSET supplied from a row selection circuit 520 which is a control unit. The signals output to the first vertical signal lines 530, after being subjected to processing by a signal processing unit 100 which is a reading unit, are transmitted to an output amplifier 580 via a horizontal signal line 570 and output from an output terminal OUT. A column selection circuit 560 which is the control unit supplies a signal for selecting columns included in the signal processing unit 100.

Configurations of the pixels 500 will now be explained. Each of the pixels 500 included in the pixel area 510 includes a photodiode 501, a transfer transistor 502, a reset transistor 504, a floating diffusion (FD) 506, an amplifier transistor 503, and a selection transistor 505. The photodiode 501, which is a photoelectric conversion unit, generates and stores charge in accordance with an amount of incident light. The transfer transistor 502, which is a transfer unit, switches between connecting and disconnecting the photodiode 501 and the FD 506. A gate electrode of the amplifier transistor 503, which is a pixel output unit, is connected to the FD 506. The reset transistor 504, which is a reset unit, switches between connecting and disconnecting a power supply VDD and the gate terminal of the amplifier transistor 503. When both of the transfer transistor 502 and the reset transistor 504 are turned on at the same time, the photodiode 501 is reset by the power supply VDD. The amplifier transistor 503 forms a source follower circuit together with a constant current supply (not shown) included in a load transistor unit 540 while the selection transistor 505, which is a pixel selection unit, is turned on. On the first vertical signal line 530, which is a first signal line, a potential level according to the gate potential of the amplifier transistor 503 at that time appears. The READ signal for driving the transfer transistor 502, the RESET signal for driving the reset transistor 504, and the LSET signal for driving the selection transistor 505 are commonly supplied to a plurality of pixels included in the same row from the row selection circuit 520.

Figure 2:
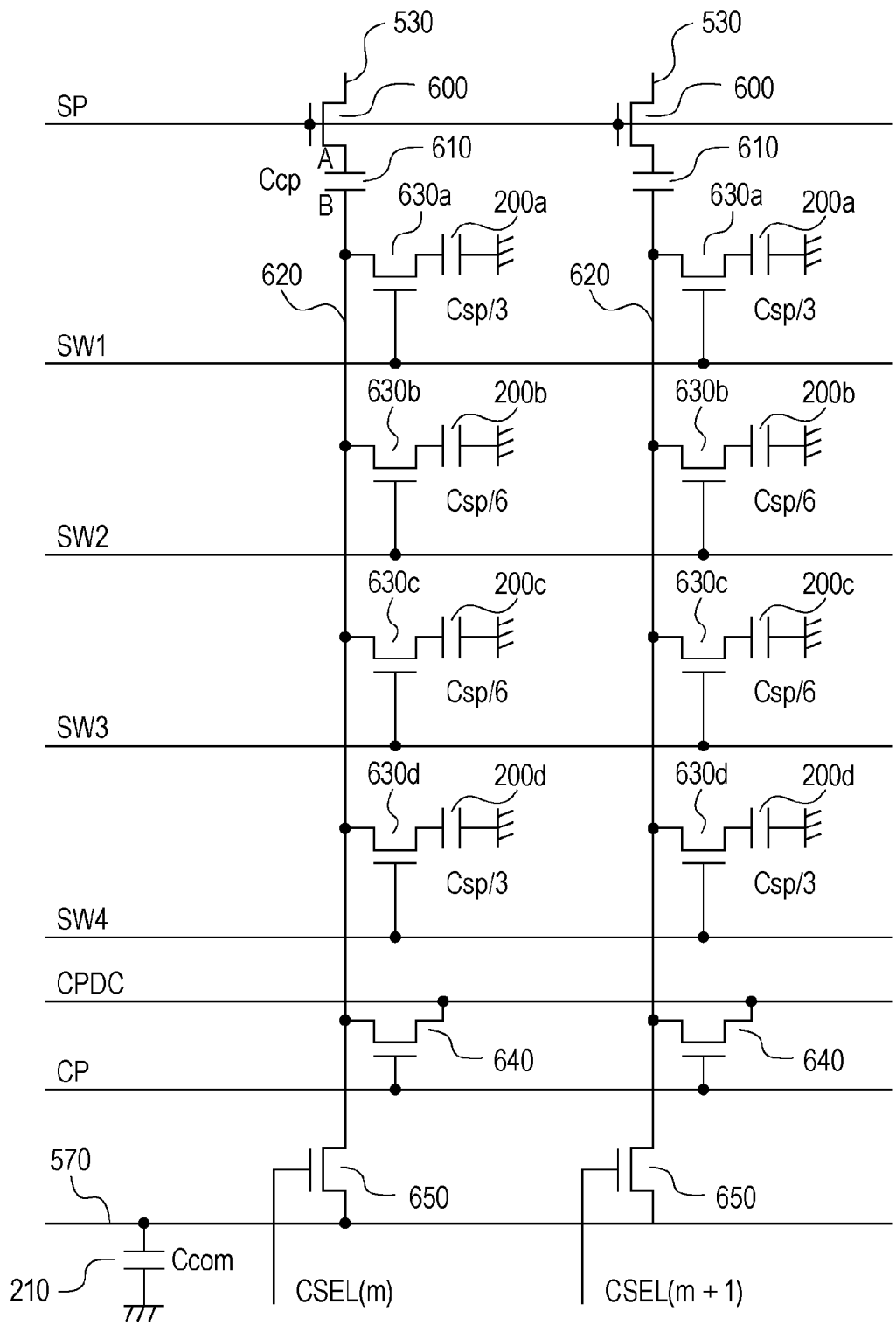
FIG. 2 is an illustration showing an example configuration of a signal processing unit according to a first embodiment of the present invention.

FIG. 2 illustrates an exemplary configuration showing more specifically the signal processing unit 100 which is the reading unit. Here, a number of pixels corresponding to columns m and (m+1) have been extracted. The signal processing unit 100 includes, for each of the pixel columns, a sample hold transistor 600, a sampling capacitor 200, a clamp capacitor 610, a second vertical signal line 620, a capacitor selection switch 630, a clamp switch 640, and a column selection switch 650. The first vertical signal line 530 is connected to the second vertical signal line 620 via the sample hold transistor 600 and the clamp capacitor 610. Connected to the second vertical signal line 620 are sampling capacitors 200a to 200d via the capacitor selection switches 630a to 630d. Further the clamp switch 640 and the column selection switch 650 are connected to the second vertical signal line 620, which is connected to the horizontal signal line 570 via the column selection switch 650. A horizontal signal line capacitor 210 corresponds to the capacitance of the horizontal signal line 570.

When the capacitor selection switches 630a to 630d are all on, the sampling capacitors 200a to 200d are electrically connected in parallel. Supposing that the capacitance value at this time is a first capacitance value Csp (also denoted by C), each of the sampling capacitors 200a and 200d has a capacitance value Csp/3, and each of the sampling capacitors 200b and 200c has a capacitance value of Cs/6.

Referring to FIG. 2, signals SP, SW1 to SW4, and CP are supplied, for example, from a timing control circuit explained later.

The operation of reading the signals using a solid-state image pickup apparatus having the configuration shown in FIGS. 1 and 2 will now be explained.

All-Pixel Reading Mode

First, an operation mode in which pixel addition is not performed will be explained with reference to FIG. 3. Here, it is assumed that the signals SW1 to SW4 supplied to the capacitor selection switches 630a to 630d are always at a high level. In other words, this is a state where a capacitor having the first capacitance value Csp is connected to the second vertical signal line 620. Note that for ease of understanding, the second vertical signal line 620 is assumed to have negligible capacitance.

A period "row n" in each column is considered. When a signal LSET(n) becomes a high level at time t1, the selection transistor 505 included in the pixel of row n is turned on and performs a source follower operation, and hence the potential of the gate of the amplifier transistor 503, i.e., a potential level corresponding to the potential of the FD 506 appears on the first vertical signal line 530. In other words, a state in which the pixel of row n is selected starts at time t1. At the same time, since the signals SP and CLP also become a high level at time t1, the clamp capacitor 610 enters a state in which a potential difference between the potential level appearing on the first vertical signal line 530 and a voltage CPDC is given.

When the signal RESET (n) becomes a high level in the form of a pulse from time t2, the potential of the FD 506 is reset in accordance with the voltage of the power supply VDD. Consequently, a level corresponding to the resetting of the FD 506 appears on the first vertical signal line 530 and a terminal A of the clamp capacitor 610.

When the signal CLP becomes a low level at time t3, the clamp switch 640 is turned off, and hence, the second vertical signal line 620 enters an electrically floating state. Consequently, the clamp capacitor 610 holds the potential difference between the voltage level corresponding to the resetting of the FD 506 and the voltage CPDC.

When the signal READ(n) becomes a high level from time t4, the charge stored in the photodiode 501 is transferred to the FD 506. The potential of the FD 506 changes in accordance with the transferred charge, a level corresponding to this appears on the first vertical signal line 530. The clamp capacitor 610 continues to hold a potential difference between a level corresponding to the resetting of the FD 506 and the voltage CPDC. Hence, the potential of the second vertical signal line 620 changes by an amount which is a difference $\Delta Vin$ between a level corresponding to the resetting of the FD 506 and a level corresponding to the transfer of the charge from the photodiode 501 to the FD 506, multiplied by a gain determined by the ratio of the capacitance values. Supposing that the capacitance value of the clamp capacitor 610 is Ccp, the voltage change $\Delta V$ generated on the second vertical signal line 620 is given by the following.

$$\Delta V = (Ccp/Csp) \times \Delta Vin \quad (4)$$

The level corresponding to the resetting of the FD 506 includes a noise component due to the switching of the reset transistor 504 and a noise component specific to the transistor that constitutes a pixel. The level due to the transfer of charge from the photodiode 501 to the FD 506 also has this noise component superimposed thereon. Hence, by performing the above-described operation using the clamp capacitor 610, noise components are decreased.

When the signal SP becomes a low level at time t5, the sample hold transistor 600 is turned off, whereby the clamp capacitor 610 and the first vertical signal line 530 are electrically disconnected. Consequently, $\Delta V$ is held in the sampling capacitors 200a to 200d.

When the signal LSET(n) becomes a low level at time t6, the amplifier transistor 503 included in the pixel 500 of row n and the first vertical signal line 530 are electrically disconnected, whereby the source follower operation ends. In other words, the state in which the pixel of row n is selected ends.

The same operations explained above are performed in parallel in each of the columns.

When signals CSEL (m) and CSEL (m+1) are supplied sequentially from time t7, the signals held in the sampling capacitors 200a to 200d of respective columns are output to the horizontal signal line 570. When the signals held in the sampling capacitors 200a to 200d are output to the horizontal signal line 570, the signals are multiplied by the gain determined by the capacitance ratio. Here, let the capacitance value of the horizontal capacitor 210 be Ccom and the gain of the output amplifier 580 be Gamp. Then an output Vout at the output terminal OUT is given by the following.

$$Vout = \Delta V \times \{Csp/(Csp+Ccom)\} \times Gamp \quad (5)$$

Similar operations are performed during periods "row n+1", "row n+2", . . . .

Two-Row Addition Mode

An operation mode for adding signals from two rows will now be explained.

Figure 3:
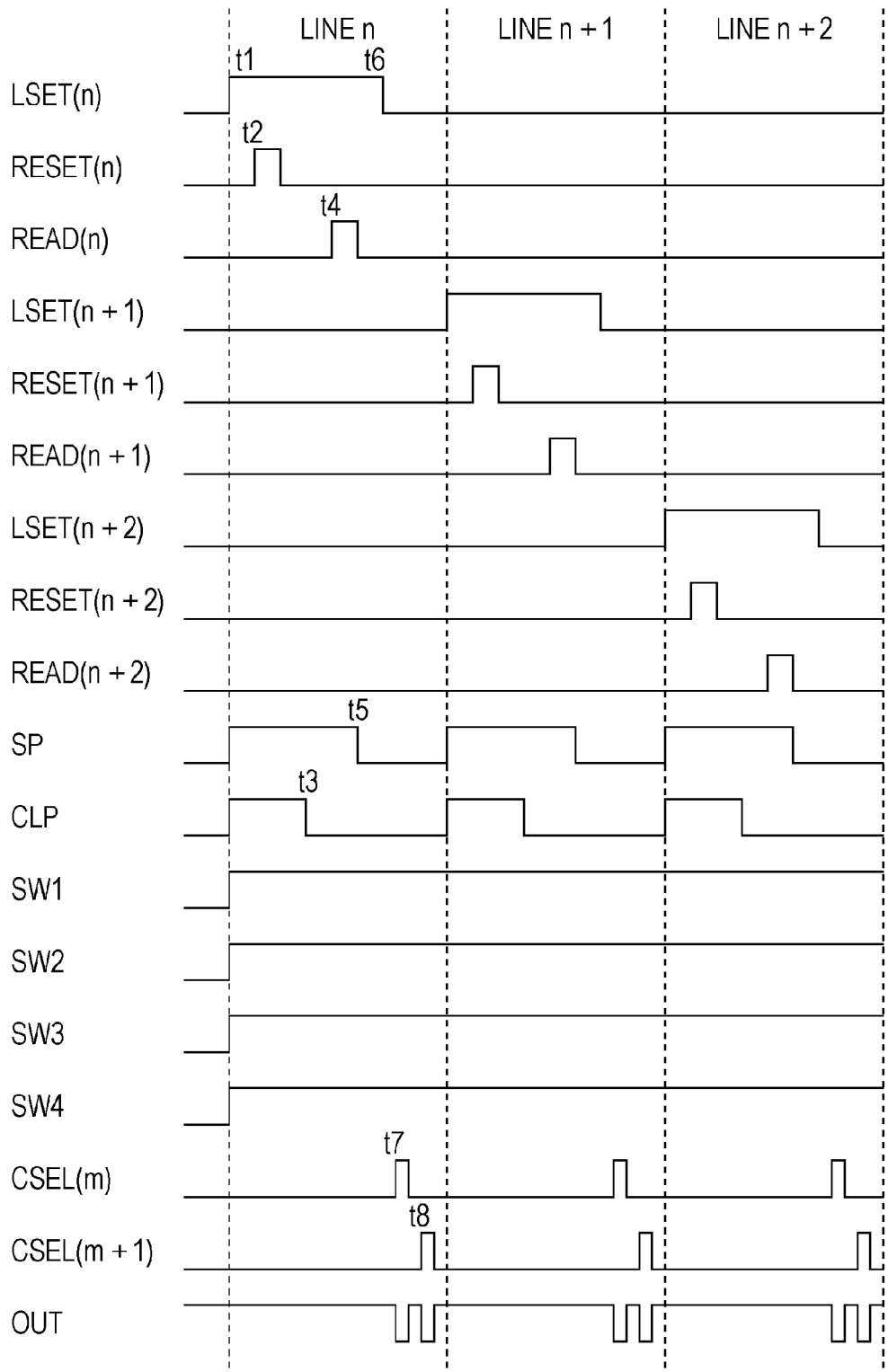
FIG. 3 is a timing diagram showing an example of driving timing according to the first embodiment.
Figure 4:
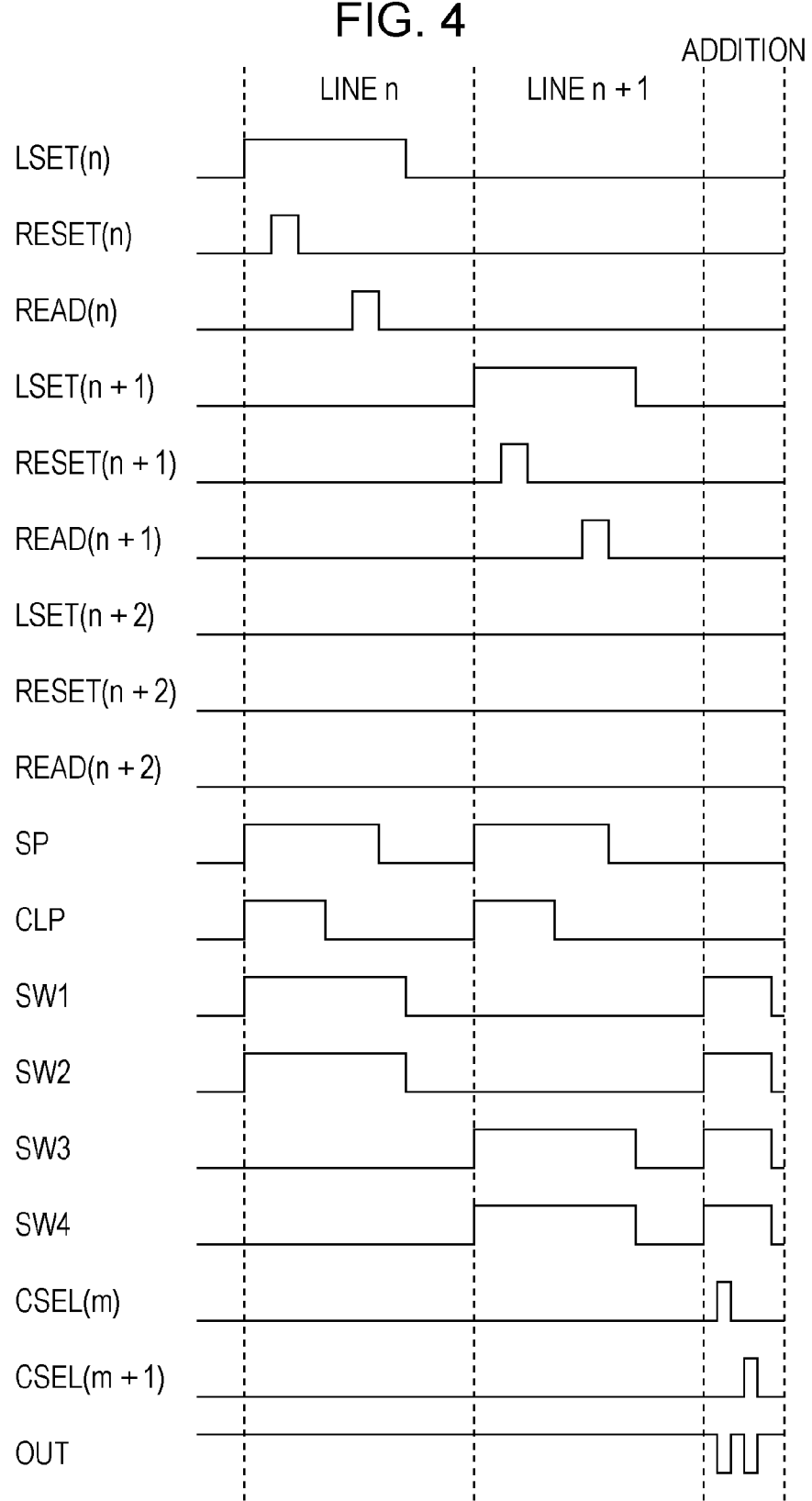
FIG. 4 is a timing diagram showing an example of driving timing according to the first embodiment.

FIG. 4 shows an exemplary driving pattern in the two-row addition mode. Here, operations different from those in the all-pixel reading mode shown in FIG. 3 will be mainly explained. In the all-pixel reading mode, the sampling capacitors 200a to 200d are treated as one capacitor, in which the signal from one pixel is held. However, the two-row addition mode is different from the all-pixel reading mode in that the sampling capacitors 200a to 200d are utilized by being divided into two groups.

In the period "row n", in each column, shown in FIG. 4, the signals SW3 and SW4 are kept at a low level, whereby the signal from the pixel of row n is held in the sampling capacitors 200a and 200b, In the period "row n+1", the signals SW1 and SW2 are kept at a low level, whereby the signal from the pixel of row n+1 is held in the sampling capacitors 200c and 200d. In other words, the signal from the pixel of row n and the signal from the pixel of row n+1 are respectively held in capacitors having the same capacitance value Csp/3+Csp/6=Csp/2.

Unlike the operation of the all-pixel reading mode shown in FIG. 3, the period "n+1" is followed by a period "addition". In the two-row addition mode, the signals SW1 to SW4 become a high level at the same time during the period "addition", whereby the sampling capacitors 200a to 200d are electrically connected. Consequently, the signal from the pixel of row n held in the sampling capacitors 200a and 200b and the signal from the pixel of row n+1 held in the sampling capacitors 200c and 200d are added.

Then the signals CSEL are sequentially supplied while the signals SW1 to SW4 are at a high level, whereby the signals each corresponding to two rows are sequentially output to the horizontal signal line 570.

Next, a gain that the signal is multiplied by will be described. Let the signal from the pixel of row n held in the sampling capacitors 200a and 200b be $\Delta V_n$ and the signal from the pixel of row n+1 held in the sampling capacitors 200c and 200d be $\Delta V_{n+1}$. Then the voltage $\Delta V2$ of the second vertical signal line 620 during the period "addition" is given by the following.

$$\Delta V2=\{(Csp/3+Csp/6)\times\Delta V_n+(Csp/3+Csp/6)\times\Delta V_{n+1}\}/\{2\times(Csp/3+Csp/6)\}=(\Delta V_n+\Delta V_{n+1})/2 \quad (6)$$

This corresponds to averaging of the signals from the pixels corresponding to two rows. An output voltage $\Delta$Vout subsequently output from the output terminal OUT via the horizontal signal line 570 and the output amplifier 580 is given by the following.

$$\Delta Vout=\Delta V2\times\{Csp/(Csp+Ccom)\}\times Gamp \quad (7)$$

As can be seen from Equations (5) and (7), the gain for the voltage $\Delta V2$ appearing on the second vertical signal line 620 is $\{Csp/(Csp+Ccom)\}\times Gamp$, which is the same as that in the all-pixel reading mode.

Three-Row Addition Mode

Next, an operation mode for adding signals from three rows will be explained.

Figure 5:
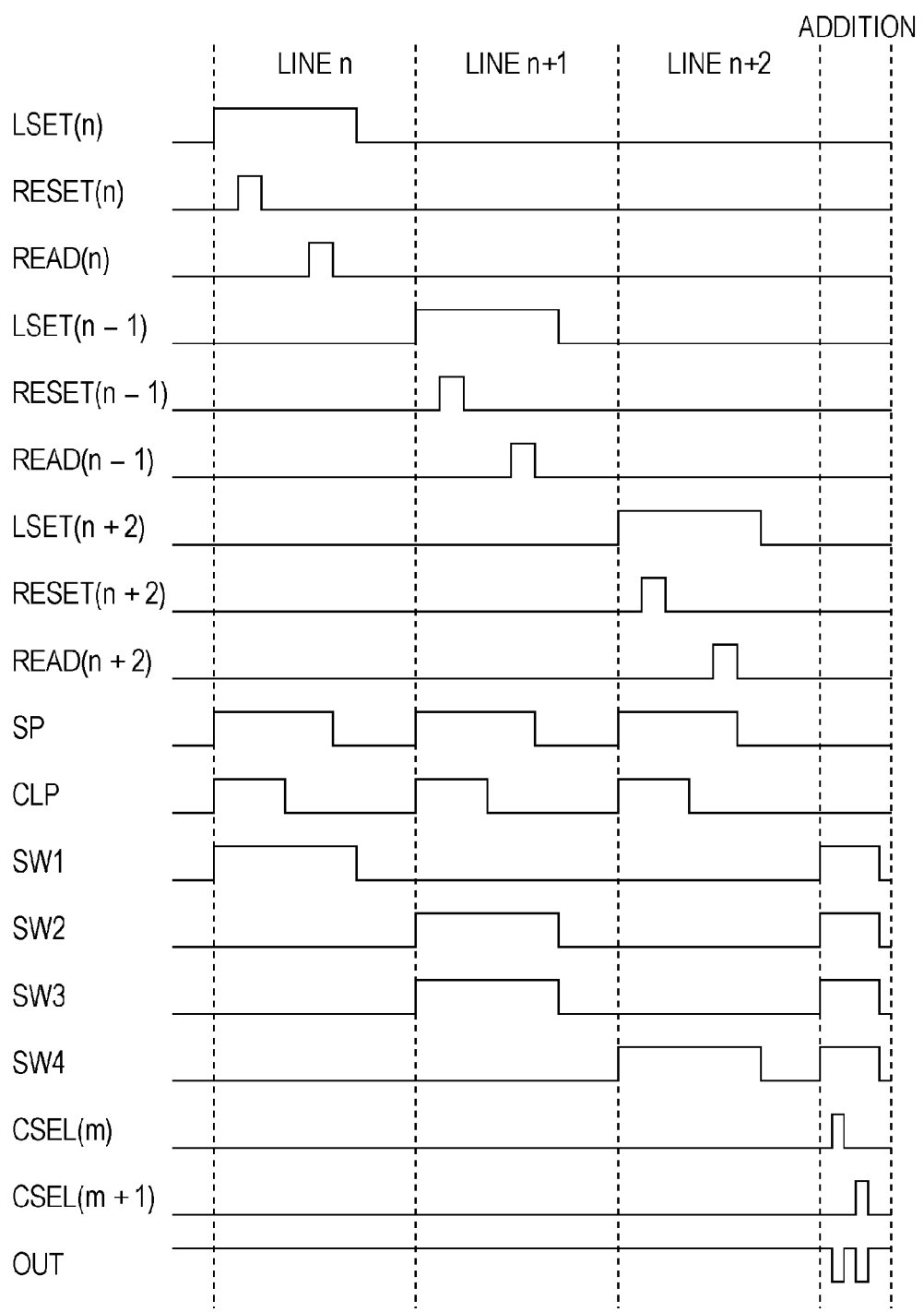
FIG. 5 is a timing diagram showing an example of driving timing according to the first embodiment.

FIG. 5 shows an exemplary driving pattern in the three-row addition mode in each column. Here, operations different from those in the all-pixel reading mode shown in FIG. 3 will be mainly explained. In the all-pixel reading mode, the sampling capacitors 200a to 200d are treated as one capacitor, in which the signal from one pixel is held. However, the three-row addition mode is different from the all-pixel reading mode in that the sampling capacitors 200a to 200d are utilized by being divided into three groups.

In the period "row n" shown in FIG. 5, the signals SW2, SW3 and SW4 are kept at a low level, whereby the signal from the pixel of row n is held only in the sampling capacitor 200a. In the period "row n+1", the signals SW1 and SW4 are kept at a low level, whereby the signal from the pixel of row n+1 is held in the sampling capacitors 200b and 200c. Further, during a period "row n+2", since the signals SW1, SW2 and SW3 are kept at a low level, the signal from the pixel of row n+2 is held in the sampling capacitor 200d. In other words, the signals from the pixels of rows n to n+2 are respectively held in capacitors having the same capacitance value Csp/3.

During the period "addition" following the period "row n+2", the signals SW1 to SW4 become a high level at the same time, whereby the sampling capacitors 200a to 200d are electrically connected. Consequently, the signal from the pixel of row n held in the sampling capacitor 200a, the signal from the pixel of row n+1 held in the sampling capacitors 200b and 200c, and the signal from the pixel of row n+2 held in the sampling capacitor 200d are added.

Then the signals CSEL are sequentially supplied while the signals SW1 to SW4 are at a high level, whereby the signals each corresponding to three rows are sequentially output to the horizontal signal line 570.

Next, a gain that the signal is multiplied by will be described. Let the signal from the pixel of row n held in the sampling capacitors 200a be $\Delta V_n$ and the signal from the pixel of row n+1 held in the sampling capacitors 200b and 200c be $\Delta V_{n+1}$. Similarly, let the signal from the pixel of row n+2 held in the sampling capacitor 200d be $\Delta V_{n+2}$. Then the voltage $\Delta V3$ of the second vertical signal line 620 during the period "addition" is given by the following.

$$\Delta V3=\{(Csp/3)\times\Delta V_n+(Csp/6+Csp/6)\times\Delta V_{n+1}+(Csp/3)\times\Delta V_{n+2}\}/\{3\times(Csp/3)\}=(\Delta V_n+\Delta V_{n+1}+\Delta V_{n+2})/3 \quad (8)$$

This corresponds to averaging of the signals from the pixels corresponding to three rows. An output voltage $\Delta$Vout subsequently output from the output terminal OUT via the horizontal signal line 570 and the output amplifier 580 is given by the following.

$$\Delta Vout=\Delta V3\times\{Csp/(Csp+Ccom)\}\times Gamp \quad (9)$$

As can be seen from Equations (5), (7), and (9), the gain for the voltage $\Delta V3$ appearing on the second vertical signal line 620 is $\{Csp/(Csp+Ccom)\}\times Gamp$, which is the same as those in the all-pixel reading mode and two-row addition mode. In other words, in a solid-state image pickup apparatus having different addition modes, such as a two-row addition mode and a three-row addition mode, the same gain is realized for the different addition modes. Consequently, the issue in the known technique is solved, and a decrease in the S/N ratio at the time of addition is suppressed, while suppressing an increase in the chip size.

An example having a two-row addition mode and a three-row addition mode has been described above; however, the number of pixels to be added in addition modes is not limited to this. To generalize the above discussion, a solid-state image pickup apparatus will be considered which can operate in an aa-row addition mode for adding signals from aa pixels and a bb-row addition mode for adding signals from bb pixels in addition to an all-pixel reading mode for reading signals from pixels without performing addition. Here, it is assumed that aa is an integer greater than one, and bb is an integer satisfying a relation aa<bb.

Case 1) aa and bb are relatively prime, because they have no common positive factor other than 1 or their greatest common divisor is 1.

Let the capacitance value in the all-pixel reading mode be C. In the case that aa and bb are relatively prime, the capacitors in the signal processing unit may be configured so as to include a first capacitor having a capacitance value of C/bb and a second capacitor having a capacitance value of C/p, where p is a common multiple of aa and bb. The number of the first capacitors is equal to or more than one and equal to or less than (bb−1). The number of the second capacitors is equal to or more than p/bb and equal to or less than {p−(p/bb)}.

Further, a third capacitor having a capacitance value of C/q may be included in addition to the first and second capacitors, where q is a common multiple of aa and bb, and is different from p. Specific numerical examples include a combination of: aa=2, bb=3, P=6, q=12. In this case, for example, one of the first capacitors having a capacitance value of C/3, two of the second capacitors having a capacitance value of C/6, and four of the third capacitors having a capacitance value of C/12 may be provided as a combination.

The capacitors in the signal processing unit may be divided into first capacitors each having a capacitance value of C/bb and second capacitors each having a capacitance value of C/(aa×bb). In this case, the capacitance value of the second capacitor corresponds to the capacitance value described above in the case that p is the least common multiple of aa and bb. When the first capacitors are provided in a number equal to aa and the second capacitors are provided in a number equal to (bb−aa)×aa, the total capacitance value is equal to C. The first and second capacitors thus configured allow the number of capacitors to be smaller than in the example described in the background.

In the aa-row addition mode, by combining one of the first capacitors and (bb−aa) of the second capacitors as a group, groups each having a capacitance value of C/aa may be provided in a number equal to aa, and hence each group is made to hold a signal of one pixel.

When aa of the second capacitors are combined as a group, (bb−aa) of these groups may be provided. Since the capacitance value of the second capacitor is C/(aa×bb), this group has a capacitance value of C/bb. In other words, this group can be treated as a capacitor same as the first capacitor. Hence, in the bb-row addition mode, by utilizing the first capacitor independently and the second capacitors as a group of aa thereof, all capacitors can be handled as if capacitors having a capacitance value of C/b were provided in a number equal to aa+(bb−aa)=bb. Hence, a capacitor having a capacitance value C/bb or a group of capacitors having a capacitance value C/bb is made to hold a signal of one pixel.

By configuring the first and second capacitors as described above, the first capacitance value C can be fully utilized in either of the addition modes. Hence it is possible to suppress a decrease in the gain in a solid-state image pickup apparatus that can operate in two different addition modes.

Case 2) aa and bb have a common divisor

Let the capacitance value in the all-pixel reading mode be C, as well. The case in which aa and bb have a common divisor can be restated as the case in which relations n≠r×m, aa=m×c, and bb=n×c are satisfied, where each of c, m, n, and r is an integer.

When aa and bb have a common divisor, the capacitors in the signal processing unit may be configured so as to include a first capacitor having a capacitance value of C/bb and a second capacitor having a capacitance value of C/p, where p is a common multiple of aa and bb. The number of the first capacitors is equal to or more than one and equal to or less than (bb−1). The number of the second capacitors is equal to or more than m and equal to or less than (bb−1)×m. Further, a third capacitor having a capacitance value of C/q may be included in addition to the first and second capacitors, where q is a common multiple of aa and bb, and is different from p. Specific numerical examples include a combination of: aa=6, bb=9, P=18, q=36. In this case two of the first capacitors having a capacitance value of C/9, six of the second capacitors having a capacitance value of C/18 and twelve of the third capacitors having a capacitance value of C/36 may be provided as a combination.

The capacitors in the signal processing unit may be divided into first capacitors having a capacitance value of C/bb and second capacitors having a capacitance value of C/p, where p is the least common multiple of aa and bb. When the first capacitors are provided in a number equal to aa and the second capacitors are provided in a number equal to (bb−aa)× m, the total capacitance value is equal to the first capacitance value C. The first and second capacitors thus configured allow the number of capacitors to be smaller than in the example described in the background.

In the aa-row addition mode, by combining one of the first capacitors and (n−m) of the second capacitors as a group, groups each having a capacitance value of C/aa may be provided in a number equal to aa, and hence each group is made to hold a signal of one pixel.

Considering that aa and bb satisfy the above relation, the capacitance value C/p of the second capacitors can be expressed by C/(m×n×c), since p=m×n×c. When m of the second capacitors are combined as a group, these groups, having a capacitance value of C/(n×c)=C/bb, may be provided in a number equal to (bb−aa). Hence, in the bb-row addition, each of the (bb−aa) groups including m of the second capacitors and each of the aa first capacitors are made to hold a signal of one pixel.

By configuring the first and second capacitors as described above, the first capacitance value C can be fully utilized in either of the addition modes. Hence it is possible to suppress a decrease in the gain in a solid-state image pickup apparatus that can operate in two different addition modes.

The aa-addition mode and bb-addition mode have been described above, by classifying various cases in accordance with the relation between aa and bb. In any of the cases described above, the common point is that the holding unit included in the signal processing unit includes the first capacitor having a capacitance value of C/bb and the second capacitor having a capacitance value of C/p (p is a common multiple of aa and bb).

According to the embodiment described above, it is possible to suppress a decrease in the S/N ratio during addition while suppressing an increase in the chip area.

A second embodiment according to the present invention will be explained using an example of a solid-state image pickup apparatus which operates in the following three operation modes: a first operation mode in which all pixels are read, a second operation mode which is a two-row addition mode, and a third operation mode which is a three-row row addition mode. The solid-state image pickup apparatus in the present embodiment is a color solid-state image pickup apparatus which is provided with a color filter corresponding to each of the pixels and realizes weighted addition for pixels of the same row.

First, the advantage of performing weighted addition will be explained. FIG. 7C shows a generally used color filter array based on a Bayer array. In FIG. 7C, R, G and B respectively represent filters that allow red, green, and blue light to pass therethrough. FIG. 7A shows row n extracted from the array. The suffixes indicate the positions of the pixels numbered starting from the left end. The figures in brackets show weights in addition. Generally, when addition of pixels is performed in the direction along a row in a solid-state image pickup apparatus provided with color filters, signals from neighboring pixels having the same color are added. Hence, referring to FIG. 7A, addition is performed for the combinations of G1 and G3, R2 and R4, G5 and G7, and R6 and R7, etc. Since the signals of the two pixels are added with a weighting ratio of 1:1, the position of the spatial gravity center of the signal after addition is a position shown by G2, which is between G1 and G3. Similarly, the spatial centers of gravity after addition appear at R3 for R2 and R4, G6 for G5 and G 7, and R7 for R6 and R8. Hence, signals of row n of an image created by an image signal processing circuit etc., external to the solid-state image pickup apparatus have an arrangement shown on the right side of FIG. 7A. In other words, G and R after addition are not spatially positioned with equal spacing, and are in an eccentric arrangement in which G and R are close to each other. Such eccentricity of the color center of gravity is not desired because it causes aliasing when objects having high spatial frequencies are photographed.

A method for lessening such eccentricity is weighted addition. Referring to FIG. 7B, the concept of weighted addition will be described. In weighted addition, three neighboring R pixels are added with a weighting ratio of 1:2:1. Consequently, the position of the spatial color center of gravity of R after addition is a position shown by R4. Similarly, pixels at R6, R8, and R 10 are added with a weighting ratio of 1:2:1. In other words, the pixels at R2, R4, and R 6 are added with a weighting ratio of 1:2:1. On the other hand, G pixels are added with a weighting ratio of 1:1. Hence, the signals of row n of an image created by an image signal processing circuit etc. external to the solid-state image pickup apparatus have an arrangement shown on the right side of FIG. 7B, in which G pixels and R pixels are arranged with equal spacing. This advantageously makes it unlikely that aliasing will occur.

Figure 6:
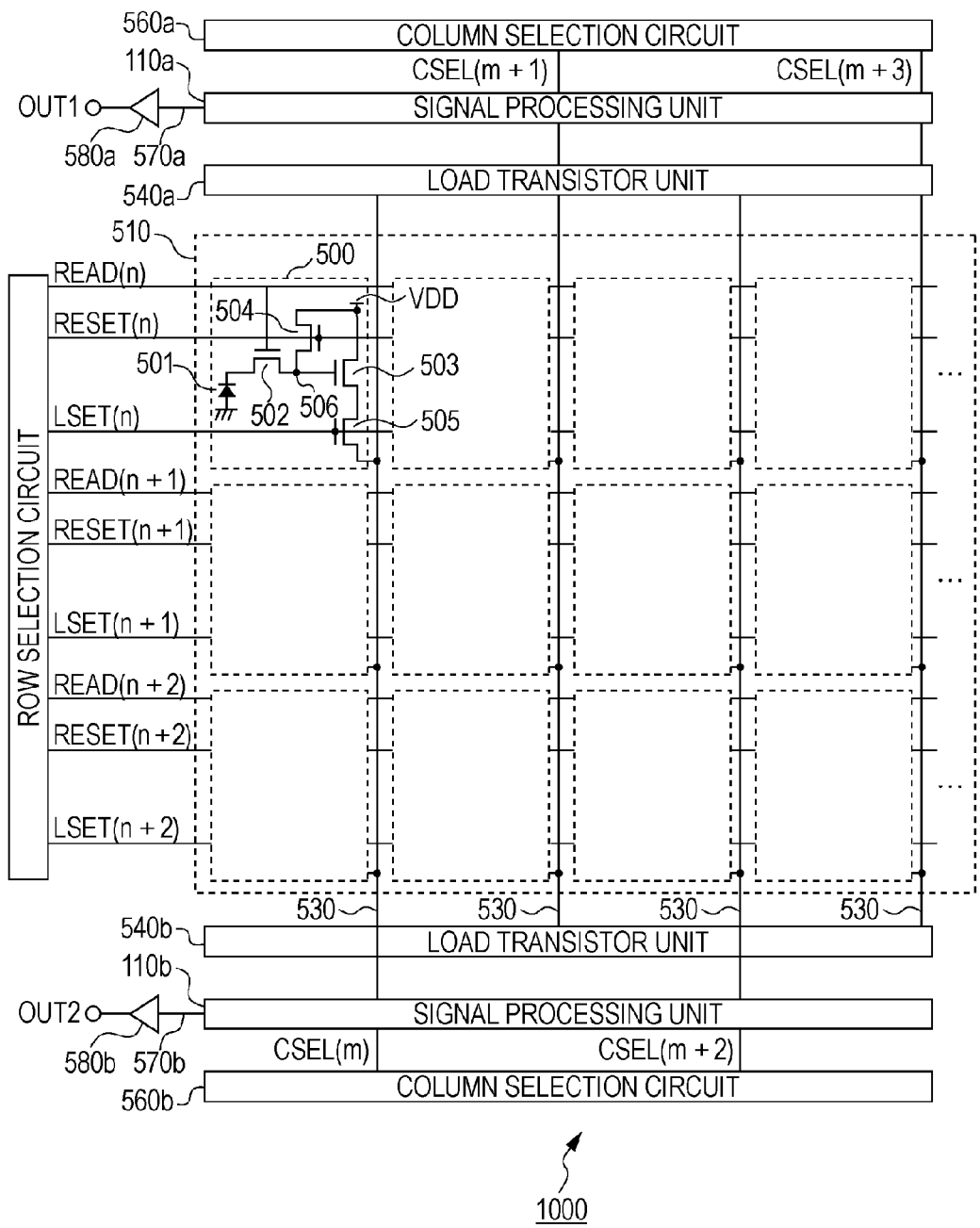
FIG. 6 is an illustration showing a schematic configuration of a solid-state image pickup apparatus according to a second embodiment of the present invention.

FIG. 6 shows a schematic configuration of the solid-state image pickup apparatus according to the present embodiment. A notable difference from the solid-state image pickup apparatus shown in FIG. 1 is that various units such as load transistor units, signal processing units, column selection circuits, and output amplifiers are provided so as to sandwich a pixel area 510. Signals from pixels of odd-numbered columns (hereinafter, called odd columns) are output from an output terminal OUT2 via a signal processing unit 110b. Signals from pixels of even-numbered columns (hereinafter, called even columns) are output from an output terminal OUT1 via a signal processing unit 110a. Filters having the same color are provided at every other pixel in a Bayer array. Hence, when a certain row is considered, the output terminal OUT1 only outputs signals from pixels having the same color, and similarly, the output terminal OUT2 only outputs signals from pixels having the same color.

Figure 8:
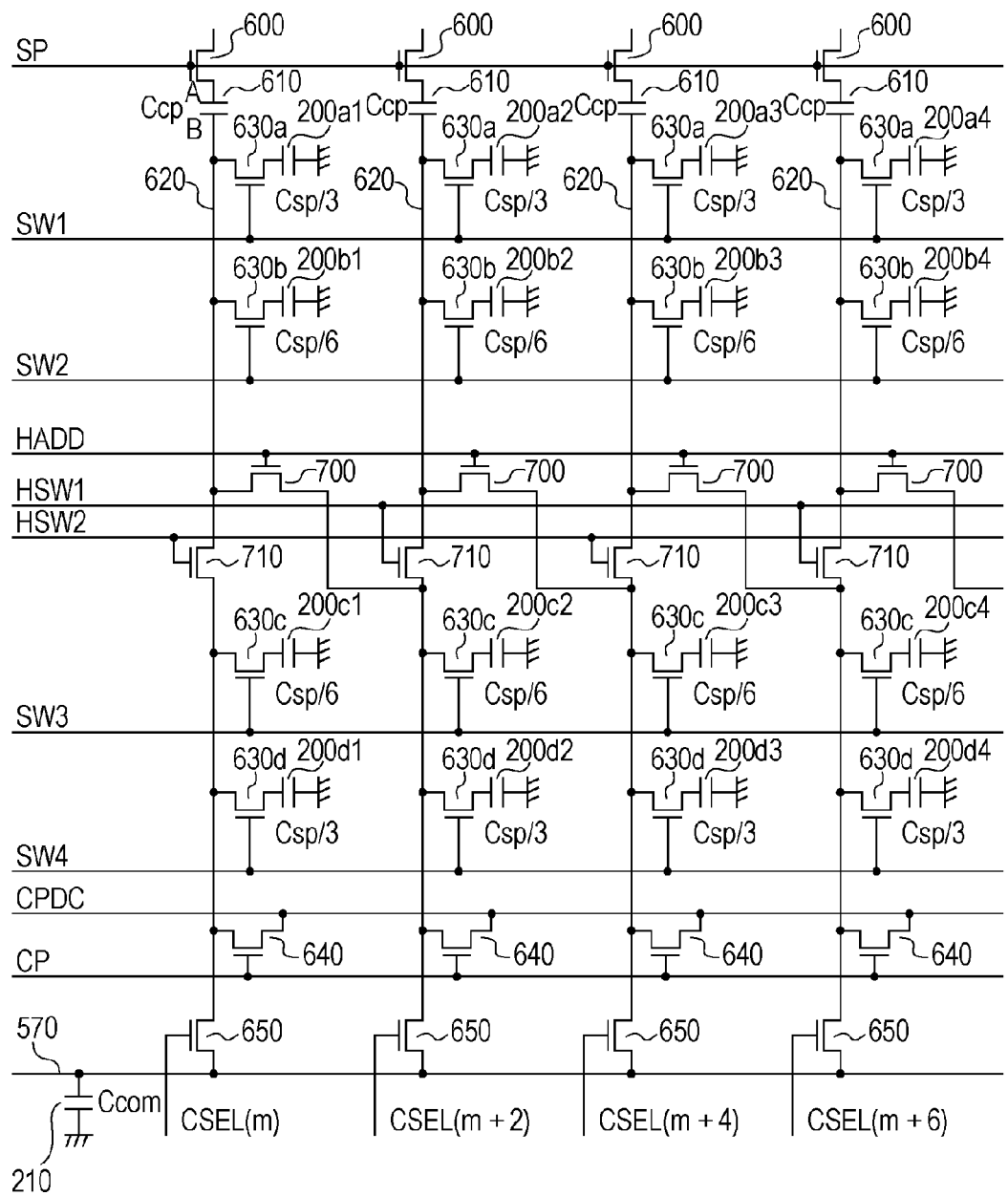
FIG. 8 is an illustration showing an example configuration of a signal processing unit according to the second embodiment.

FIG. 8 shows an exemplary configuration of a signal processing unit 100 functioning as a reading unit. Here, a portion corresponding to same-color pixels of four columns have been extracted. Notable differences from the configuration shown in FIG. 2 are that inter-column switches 700, functioning as connection units, and column addition selection switches 710 have been added.

All-Pixel Reading Mode

Figure 9:
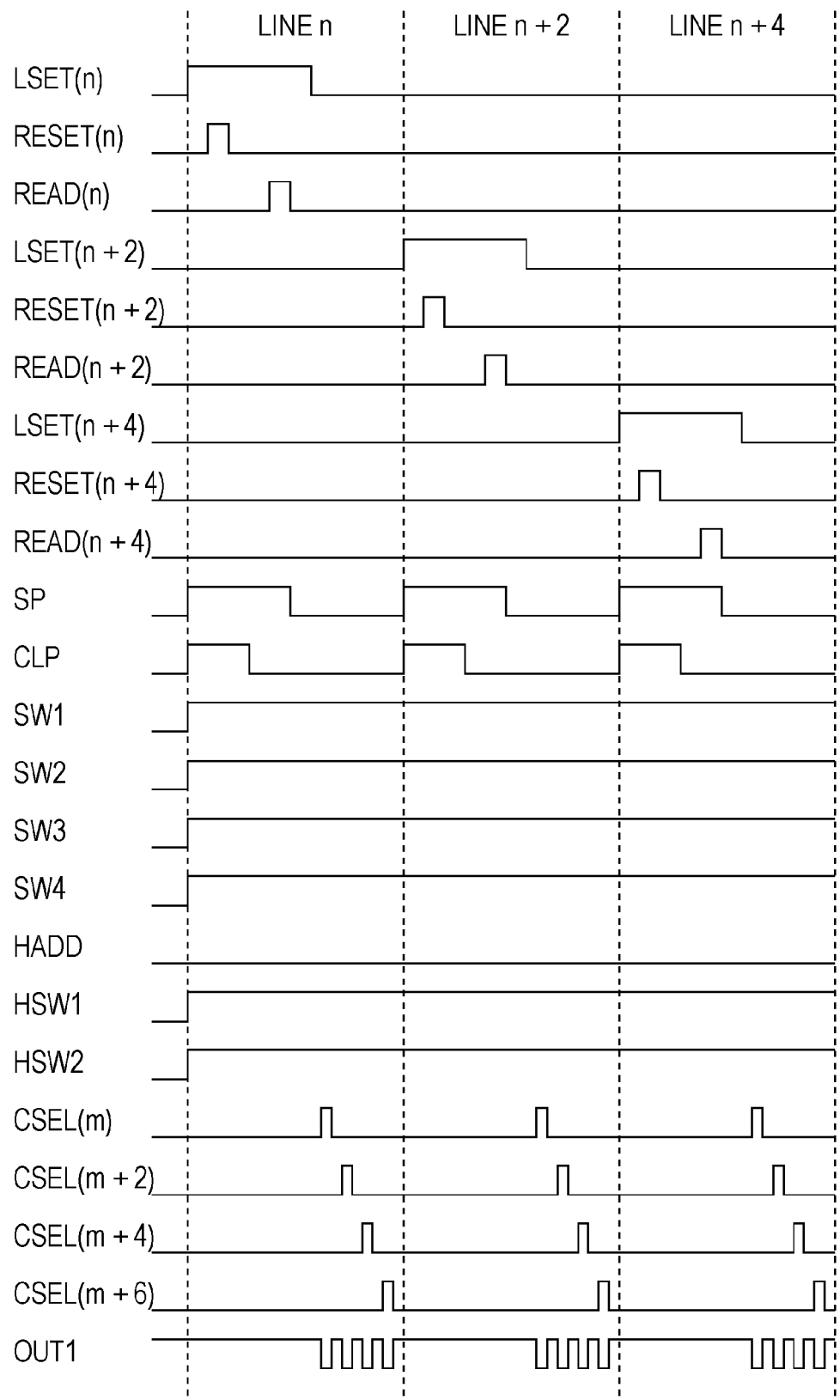
FIG. 9 is a timing diagram showing an example of driving timing according to the second embodiment.

Referring to FIG. 9, an operation mode in which pixel addition is not performed will be explained. A signal HADD for driving the inter-column switches 700 and signals HSW1 and HSW2 for driving the column addition selection switches 710 have been added to the timing chart shown in FIG. 3.

The operation performed in the all-pixel reading mode shown in FIG. 9 is similar to that shown in FIG. 3 except that the signal HADD is kept at a low level and the signals HSW1 and HSW2 are kept at a high level. In each of the columns, signals from the respective pixels are held in sampling capacitors 200a to 200d. Hence, similarly to the first embodiment, a voltage change ΔV generated on a second vertical signal line 620 is output from the output terminal OUT after being multiplied by a gain of {Csp/(Csp+Ccom)}×Gamp. Here, Ccp is the capacitance value of a clamp capacitor 610 and Ccom is the capacitance value of a horizontal signal line 570.

Two-Row Addition Mode

The two-row addition mode will now be explained with reference to FIG. 10. The difference from the timing diagram shown in FIG. 4 is that although the period "n" is followed by the period "n+1" in FIG. 4, the period "n+1" is replaced with a period "n+2" in FIG. 9, and a signal from the pixel of row n+2 is read during the period "n+2". This is because in the Bayer array, neighboring pixels on the same line have different colors as shown in FIG. 7. In addition, the period "addition" in FIG. 4 has been replaced with a period "row addition", a period "column addition", and a period "output".

The period "row n" in each column is considered. When a signal LSET(n) becomes a high level at time t1, a selection transistor 505 included in the pixel of row n is turned on and performs a source follower operation, and hence the potential of the gate of an amplifier transistor 503, i.e., a potential level corresponding to the potential of a FD 506 appears on a first vertical signal line 530. At the same time, since signals SP and CLP become a high level at time t1, a clamp capacitor 610 enters a state in which it is given a potential difference between the potential level appearing on the first vertical signal line 530 and a voltage CPDC. Since signals SW1 and SW2 also become a high level at time t1, sampling capacitors 200a1 and 200b1 enter a state of being connected to a second vertical signal line 620. In other words, this is the same as the state in which a sampling capacitor having a capacitance value of Csp/3+Csp/6=Csp/2 is connected to the second vertical signal line 620. Further, the signals HSW1 and HSW2 also become a high level at time t1, whereby the column addition selection switch 710 enters an on state.

When a signal RESET (n) becomes a high level in the form of a pulse from time t2, the potential of the FD 506 is reset in accordance with the voltage of the power supply VDD. Consequently, a level corresponding to the resetting of the FD 506 appears on the first vertical signal line 530 and a terminal A of the clamp capacitor 610.

When the signal CLP becomes a low level at time t3, a clamp switch 640 is turned off, and hence, the second vertical signal line 620 enters an electrically floating state. Consequently, the clamp capacitor 610 holds the potential difference between the voltage level corresponding to the resetting of the FD 506 and the voltage CPDC.

When a signal READ(n) becomes a high level from time t4 in the form of a pulse, the charge stored in a photodiode 501 is transferred to the FD 506. The potential of the FD 506 changes in accordance with the transferred charge, a level corresponding to this appears on the first vertical signal lines 530. The clamp capacitor 610 continues to hold a potential difference between a level corresponding to the resetting of the FD 506 and the voltage CPDC. Hence, the potential of the second vertical signal line 620 changes by an amount which is a difference ΔVin between a level corresponding to the resetting of the FD 506 and a level corresponding to the transfer of the charge from the photodiode 501 to the FD 506 multiplied by a gain determined by the ratio of the capacitance values. By letting the capacitance value of the clamp capacitor 610 be Ccp, the voltage change ΔV generated on the second vertical signal line 620 is given by the following.

$$\Delta V = (Ccp/Csp) \times \Delta Vin \tag{10}$$

The level corresponding to the resetting of the FD 506 includes a noise component due to the switching of a reset transistor 504 and a noise component specific to the transistor that constitutes a pixel. The level due to the transfer of charge from the photodiode 501 to the FD 506 also has this noise component superimposed thereon. Hence, by performing the above-described operation using the clamp capacitor 610, noise components are decreased.

When the signal SP becomes a low level at time t5, the sample hold transistor 600 is turned off, whereby a terminal A of the clamp capacitor 610 enters an electrically floating state.

When the signal LSET(n) becomes a low level at time t6, the amplifier transistor 503 included in the pixel 500 of row n and the first vertical signal line 530 are electrically disconnected, whereby the source follower operation ends. The signals SW1 and SW2 also become a low level at time t6, whereby ΔV is held in the sampling capacitors 200a1 and 200b1. Although the signals LSET(n), SW1, and SW2 become a low level at the same time in this diagram, the timing need not be the same.

The operation during the period "row n+2" is similar to the period "row n". However, the signals LSET (n), RESET (n), and READ (n) are to be respectively replaced with signals LSET (n+2), RESET (n+2), and READ (n+2).

In the period "row addition" subsequent to the period "n+2", the signals SW1 to SW4 become a high level, whereby the sampling capacitors 200a to 200d are electrically connected. Consequently, the signals held in the sampling capacitors 200a and 200b are added. In other words, the average level of the signals from the pixels of rows n and n+2 appears on the second vertical signal line 620.

During the period "column addition", the signals SW1 to SW4 continue to be kept at a high level as in the period "row addition". When the signal HSW2 becomes a low level during the period "column addition", the column addition selection switches 710 are turned off. Hence, a state is entered in which only the sampling capacitors 200a and 200b are electrically connected to the second vertical signal lines 620 of the odd-numbered columns counted from the left of FIG. 8 (columns m, m+4, etc.). On the other hand, since the signal HSW1 is kept at a high level, the state is maintained in which the sampling capacitors 200a to 200d are electrically connected to the second vertical signal lines 620 of the even-numbered columns counted from the left of FIG. 8 (columns m+2, m+6, etc.). In other words, this state can be considered to be the state in which a capacitor having a capacitance value of Csp/2 is connected to the second vertical signal lines 620 of the odd-numbered columns counted from the left, and a capacitor having a capacitance value of Csp is connected to the second vertical signal lines 620 of the even-numbered columns counted from the left.

When the signal HADD becomes a high level during the period "column addition", the inter-column switches 700 connect the second vertical signal lines 620 of columns m to m+4. From the view point of sampling capacitors, a state is entered in which the sampling capacitors 200a1 and 200b1, 200a2 to 200d2, and 200c3 and 200d3 are electrically connected. Hence, it becomes possible that the signals from columns m, m+2, and m+4 are added with a ratio of 1:2:1 by making the signal HADD at a high level. Further, similar structures are repeated for columns m+8 and more, although not shown. Hence, regarding columns m+4, m+6, and m+8, for example, a state is entered in which the sampling capacitors 200a3 and 200b3, 200a4 to 200d4, and 200c5 and 200d5 are electrically connected.

During the period "output", signals CSEL (m+2), CSEL (m+6) etc. are supplied, whereby the signals from pixels of three neighboring columns, among two rows provided with the same color filters, are added with the weights of 1:2:1 in the direction of a row, and the resultant signal is transmitted to the horizontal signal line 570.

By letting the signal obtained by the 1:2:1 weighted addition be ΔV and the gain of an output amplifier 580 be Gamp, a signal Vout output from the output amplifier 580 is given by the following.

$$Vout=\Delta V\times\{Csp/(Csp+Ccom)\}\times Gamp \quad (11)$$

In other words, the gain is the same as that in the all-pixel pixel reading mode.

Figure 10:
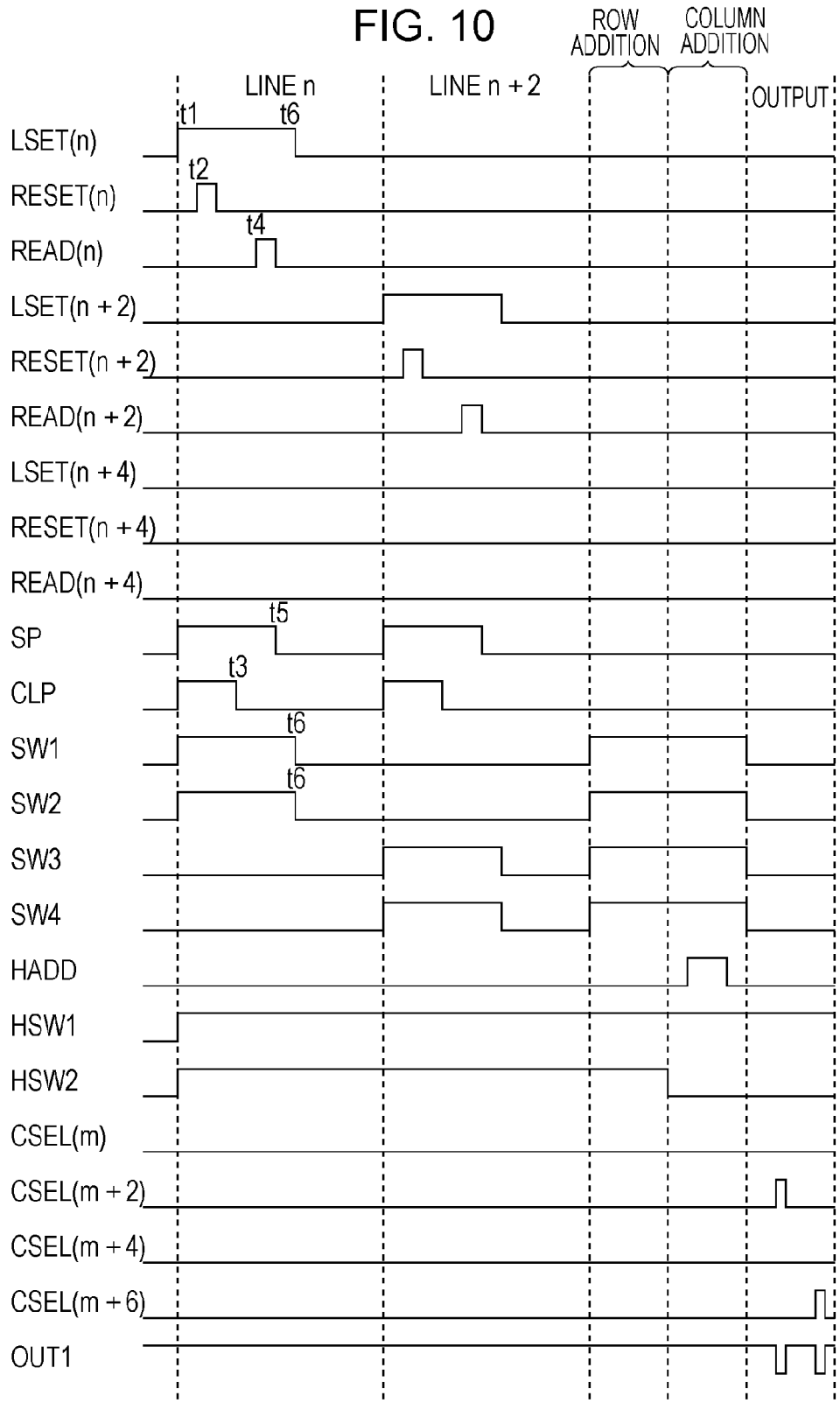
FIG. 10 is a timing diagram showing an example of driving timing according to the second embodiment.

In FIG. 10, the signal HADD becomes a low level in the period "output"; however the signal HADD may be set at a high level. When the signal HADD is set at a high level, the signal transferred to the horizontal signal line 570 corresponds to a signal held in a capacitor having a capacitance value of 2Csp. Hence, the gain for this signal is {2Csp/(Csp+Ccom)}×Gamp. In other words, a gain higher than that in the all-pixel reading mode can advantageously be applied. However, when the capacitance value is increased, the time constant of a transient response which is determined by the stray resistance and capacitance of the circuit increases, thereby disadvantageously causing the operation speed to be lowered. Hence, the signal HADD needs to be set in accordance with this requirement.

The operation in the three-row addition mode is similar to the operation in the two-row addition mode except that the sampling capacitors 200 are utilized in such a manner as to be divided into three. Hence the explanation thereof is omitted. Also in the three-row addition mode, the signals held in the sampling capacitors are output after being multiplied by a gain of {Csp/(Csp+Ccom)}×Gamp.

Note that even when using the signal processing unit 100 having the configuration shown in FIG. 8, addition without weighting may be performed. In this case, by always keeping the signals HSW1 and HSW2 at a high level and the signal HADD at a low level, this configuration can be used as a configuration similar to that shown in FIG. 2.

An example having a two-row addition mode and a three-row addition mode has been described above; however, the number of pixels to be added in addition modes is not limited to this. Generalization by using an aa-row addition mode and a bb-row addition mode is of course possible as described in the first embodiment.

According to the embodiment described above, it is possible to suppress a decrease in the S/N ratio during addition while suppressing an increase in the chip area.

In the first and second embodiments, examples were described in which the noise component due to pixels is decreased using a clamp capacity. In a third embodiment according to the present invention, a configuration will be described which can amplify a signal as well as decrease the noise component due to pixels. The present embodiment will be described also using an example of a solid-state image pickup apparatus which operates in the following three operation modes: a first operation mode in which all pixels are read, a second operation mode which is a two-row addition mode, and a third operation mode which is a three-row addition mode.

Figure 11:
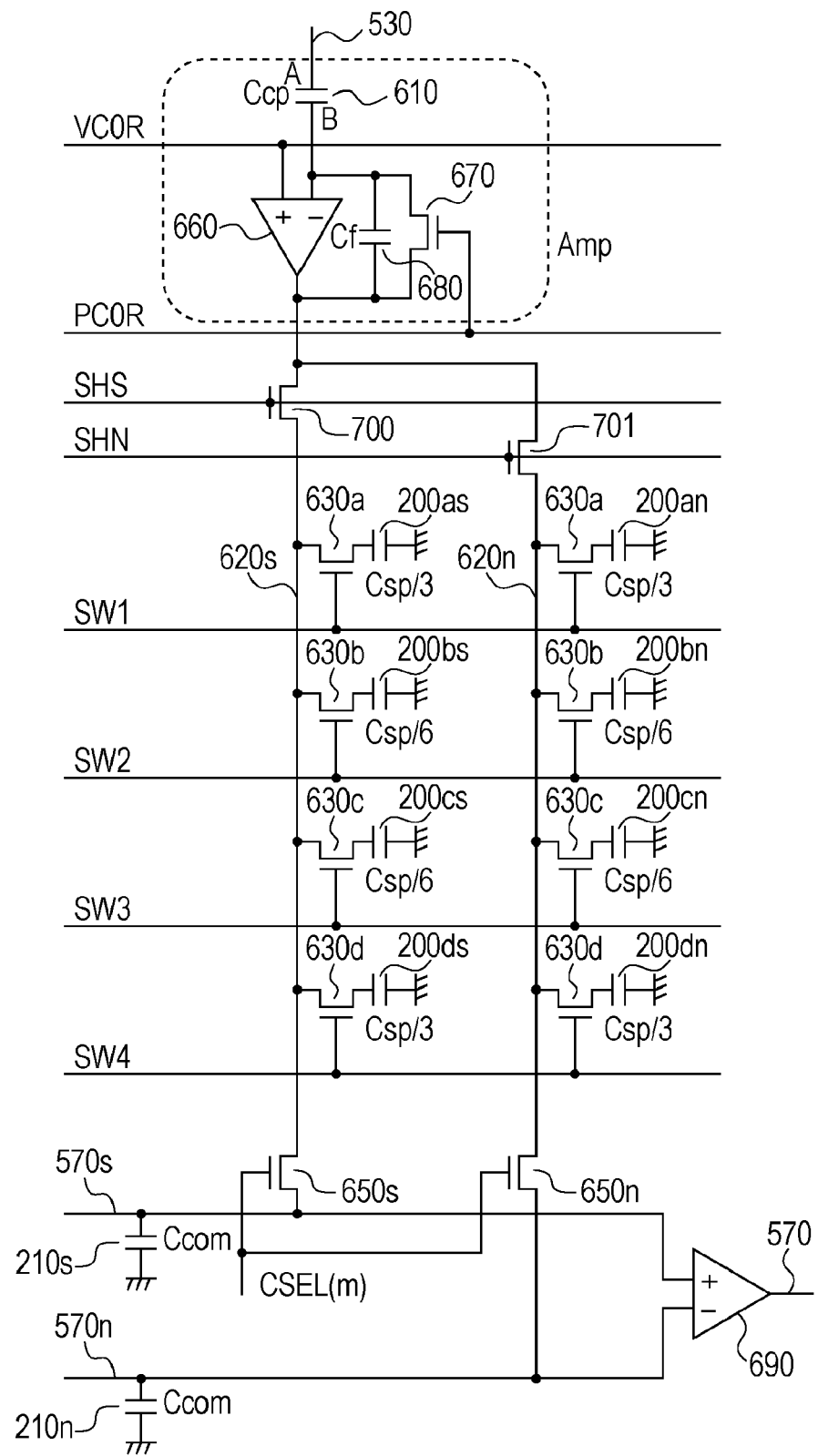
FIG. 11 is an illustration showing an example configuration of a signal processing unit according to a third embodiment of the present invention.

FIG. 11 shows a configuration of one column extracted from a signal processing unit 100 functioning as a reading unit.

A column amplifier unit Amp includes a clamp capacitor 610, an operational amplifier 660, a short circuit switch 670, and a feedback capacitor 680. One terminal A of the clamp capacitor 610 is connected to a first vertical signal line 530, and the other terminal B is connected to the inverting terminal of the operational amplifier 660 and also to one terminal of the feedback capacitor 680 and one main electrode of the short circuit switch 670. The other terminal of the feedback capacitor 680 is connected to the other main electrode of the short circuit switch 670 and the output terminal of the operational amplifier 660. A reference voltage VC0R is applied to the non-inverting terminal of the operational amplifier 660. The short circuit switch 670 is controlled by a signal PC0R. The signal PC0R is supplied from, for example, a timing control circuit described later.

The output of the operational amplifier 660, i.e., the output of the column amplifier unit Amp is connected to a second vertical signal line 620s via a switch 700 and to a third vertical signal line 620n via a switch 701.

Sampling capacitors 200as to 200ds are connected to the second vertical signal line 620s via corresponding capacitor selection switches 630as to 630ds. Here, each of the sampling capacitors 200as and 200cs, and capacitors 200an and 200dn has a capacitance value of Csp/3, and each of the sampling capacitors 200bs and 200cs, and sampling capacitors 200bn and 200cn has a capacitance value of Csp/6. The second vertical signal line 620s is connected to a first horizontal signal line 570s via a column selection switch 650s controlled by a signal CSEL(m). The first horizontal signal line 570s has a capacitance value of Ccom. A horizontal capacitor 210s schematically represents the capacitance of the horizontal signal line 570s. The first horizontal signal line 570s is connected to the non-inverting input terminal of a differential amplifier 690, which is an output unit.

The sampling capacitors 200an to 200dn are connected to the third vertical signal line 620n via corresponding capacitor selection switches 630an to 630dn. The third vertical signal line 620n is connected to a second horizontal signal line 570n via a column selection switch 650n controlled by the signal CSEL(m). The second horizontal signal line 570n has a capacitance value of Ccom. A horizontal capacitor 210n schematically represents the capacitance of the second horizontal signal line 570n. The second horizontal signal line 570n is connected to the inverting input terminal of the differential amplifier 690, which is the output unit.

Figure 12:
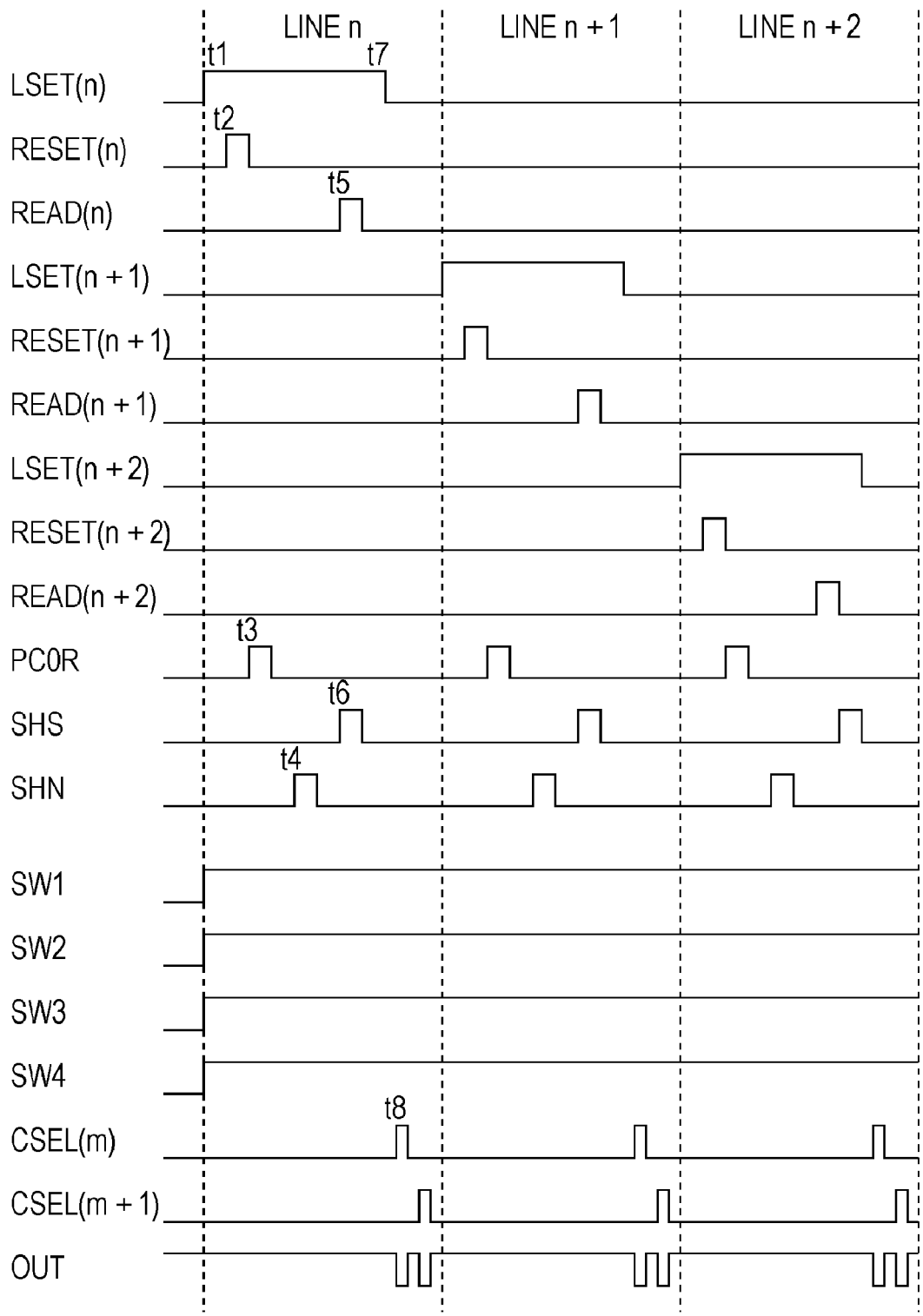
FIG. 12 is a timing diagram showing an example of driving timing according to the third embodiment.

Referring to FIG. 12, an operation mode in which pixel addition is not performed will now be described. Note that a pixel area connected to the first vertical signal lines 530 is the same as that shown in FIG. 1, and a monochrome solid-state image pickup apparatus is considered.

A period "row n" in each column is considered. When a signal LSET(n) becomes a high level at time t1, a selection transistor 505 included in the pixel of row n is turned on and performs a source follower operation, and hence the potential of the gate of an amplifier transistor 503, i.e., a potential level corresponding to the potential of a FD 506 appears on the first vertical signal line 530.

When a signal RESET (n) becomes a high level in the form of a pulse from time t2, the potential of an FD 506 is reset in accordance with the voltage of the power supply VDD. Consequently, a level corresponding to the resetting of the FD 506 appears on the first vertical signal line 530 and a terminal A of the clamp capacitor 610.

When the signal PC0R becomes a high level in the form of a pulse at time t3, the short circuit switch 670 short-circuits the inverting input terminal and output terminal of the operational amplifier 660. At this time the voltage of the inverting terminal of the operational amplifier 660 becomes a potential VC0R due to the virtual grounding of the operational amplifier 660. In other words, both ends of the feedback capacitor 680 are reset by VC0R, and the voltage of the terminal B of the clamp capacitor 610 also becomes VC0R. Since signals SHS and SHN are at a low level at time3, the resetting is performed by the output of the operational amplifier 660. When the signal PC0R becomes a low level, the terminal B of the clamp capacitor 610 enters an electrically floating state. Consequently, the clamp capacitor 610 holds the potential difference between the voltage level corresponding to the resetting of the FD 506 and the voltage VC0R.

When the signal SHN becomes a high level from time t4 in the form of a pulse, the output of the column amplifier unit Amp is held in the sampling capacitors 200an to 200dn. The signals held in the sampling capacitors 200an to 200dn include an output offset of the column amplifier unit Amp.

When a signal READ(n) becomes a high level from time t5 in the form of a pulse, the charge stored in a photodiode 501 is transferred to the FD 506. The potential of the FD 506 changes in accordance with the transferred charge, and a level corresponding to this appears on the first vertical signal line 530. The clamp capacitor 610 continues to hold a potential difference between a level corresponding to the resetting of the FD 506 and the voltage PC0R. Hence, the potential of the terminal B of the clamp capacitor 610 changes by an amount which is a difference $\Delta Vin$ between a level corresponding to the resetting of the FD 506 and a level corresponding to the transfer of the charge from the photodiode 501 to the FD 506. The difference from the first and second embodiments is that $\Delta Vin$ is multiplied by a gain determined by the capacitance value ratio of the clamp capacitor 610 and the feedback capacitor 680. By letting the capacitance value of the clamp capacitor 610 be C0 and the capacitance value of the feedback capacitor 680 be Cf, an output Ampout of the column amplifier unit Amp is given by the following.

$$Ampout = (C0/Cf) \times \Delta Vin \qquad (12)$$

The level corresponding to the resetting of the FD 506 includes a noise component due to the switching of a reset transistor 504 and a noise component specific to the transistor that constitutes a pixel. Hence, by performing the above-described operation using the clamp capacitor 610, noise components due to pixels are decreased. Further, the voltage change $\Delta Vin$ can be amplified with the ratio of C0/Cf, according to the present embodiment.

When the signal SHS becomes a high level at time t6 and subsequently becomes a low level, the voltage given by Equation (12) is held in the sampling capacitors 200as to 200ds. The signals held in the sampling capacitors 200as to 200ds include an output offset of the column amplifier unit Amp.

When the signal LSET(n) becomes a low level at time t7, the amplifier transistor 503 included in the pixel 500 of row n and the first vertical signal line 530 are electrically disconnected, whereby the source follower operation ends. In other words, the state in which the pixel of row n is selected ends.

When signals CSEL (m) and CSEL (m+1) are supplied sequentially from time t8, the signals held in the sampling capacitors 200as to 200ds of respective columns are output to the horizontal signal line 570s. When the signals held in the sampling capacitors 200as to 200ds are output to the horizontal signal line 570s, the signals are multiplied by the gain determined by the capacitance ratio. By letting the capacitance value of the horizontal capacitor 210s be Ccom, a voltage Vs1 appearing on the first horizontal signal line 570s is given by the following.

$$Vs1 = \{Csp/(Csp+Ccom)\} \times (C0/Cf) \times \Delta Vin \qquad (13)$$

Similarly, when the signals held in the sampling capacitors 200an to 200dn are output to the horizontal signal line 570n, the signals are also multiplied by the gain determined by the capacitance ratio. By letting the capacitance value of the horizontal capacitor 210n be Ccom, a voltage Vn1 appearing on the first horizontal signal line 570n is given by the following.

$$Vn1=\{Csp/(Csp+Ccom)\}\times(C0/Cf)\times VC0R \quad (14)$$

The difference between Vs1 and Vs2 input to the differential amplifier 690 is output from the output terminal OUT. Since Vs1 and Vs2 both include the output offset of the column amplifier unit Amp, the output terminal OUT outputs a signal in which the output offset of the column amplifier unit Amp has been reduced. In other words, by letting Vout1 be a signal output from the output terminal OUT of the differential amplifier 690, Vout1 is given by the following.

$$Vout1=\{Csp/(Csp+Ccom)\}\times(C0/Cf)\times\Delta Vs3-\{Csp/(Csp+Ccom)\}\times(C0/Cf)\times\Delta Vn3=\{Csp/(Csp+Ccom)\}\times(C0/Cf)\times(\Delta Vs3-\Delta Vn3) \quad (15)$$

Similar operations are performed during periods "row n+1" and "row n+2".

Two-Row Addition Mode

An operation mode for adding signals from two rows will now be described.

Figure 13:
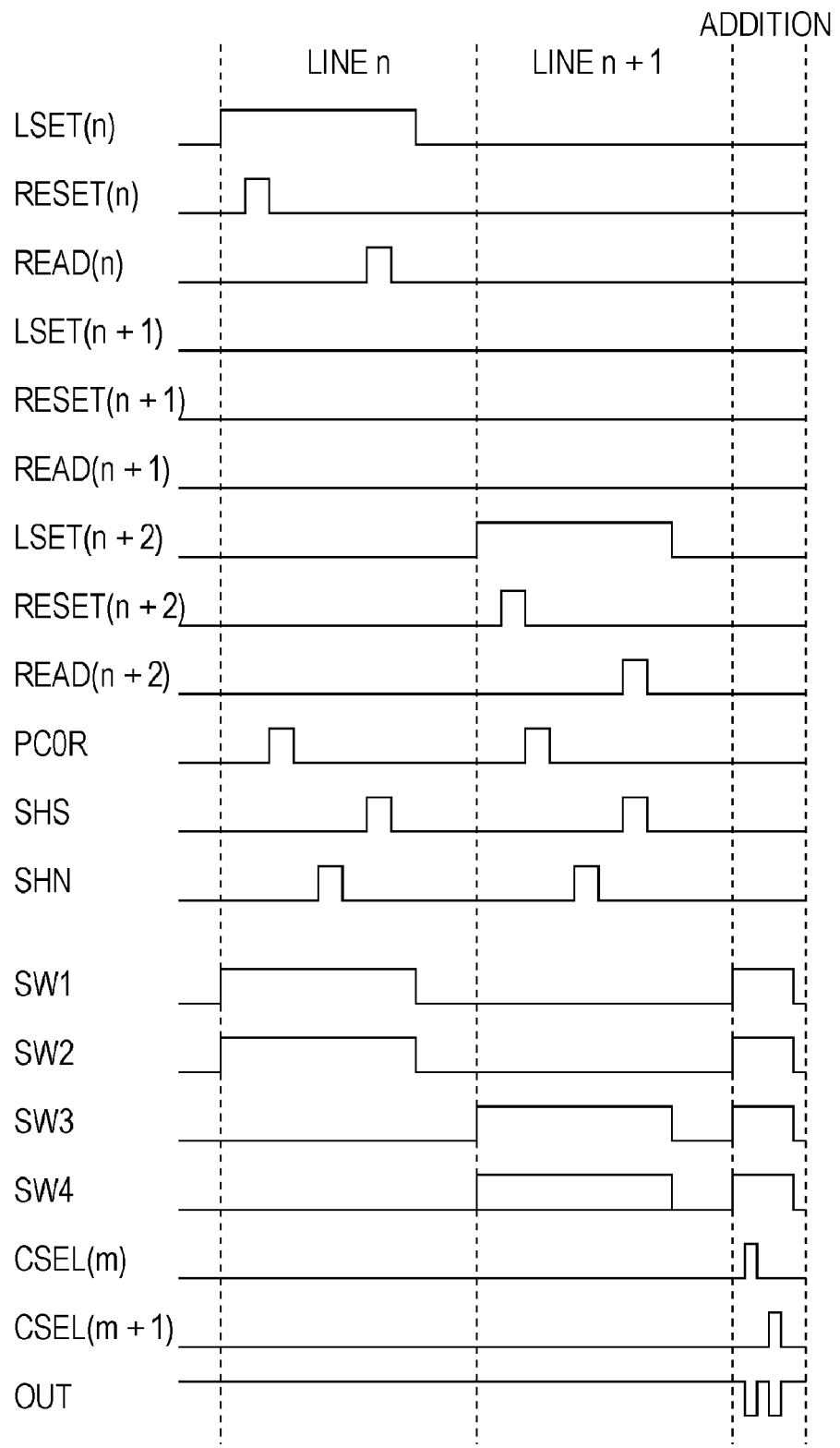
FIG. 13 is a timing diagram showing an example of driving timing according to the third embodiment.

FIG. 13 shows an example driving pattern in the two-row addition mode. Here, operations different from those in the all-pixel reading mode shown in FIG. 12 will be mainly described. In the all-pixel reading mode, the sampling capacitors 200an to 200dn are treated as one capacitor, and the sampling capacitors 200as to 200ds are treated as one capacitor. However, the two-row addition mode is different from the all-pixel reading mode in that the sampling capacitors 200an to 200dn are utilized by being divided into two groups and the sampling capacitors 200as to 200ds are utilized by being divided into two groups.

In the period "row n" in each column shown in FIG. 13, the signals SW3 and SW4 are kept at a low level, whereby the signal from the pixel of row n is held in the sampling capacitors 200as and 200bs. In the period "row n+1", the signals SW1 and SW2 are kept at a low level, whereby the signal from the pixel of row n+1 is held in the sampling capacitors 200cs and 200ds. In other words, the signal from the pixel of row n and the signal from the pixel of row n+1 are respectively held in capacitors having the same capacitance value Csp/3+Csp/6=Csp/2.

Different from the operation of the all-pixel reading mode shown in FIG. 12, the period "n+1" is followed by a period "addition". In the two-row addition mode, the signals SW1 to SW4 become a high level at the same time during the period "addition", whereby the sampling capacitors 200as to 200ds are electrically connected. Consequently, the signal from the pixel of row n held in the sampling capacitors 200as and 200bs and the signal from the pixel of row n+1 held in the sampling capacitors 200cs and 200ds are added.

Then the signals CSEL are sequentially supplied while the signals SW1 to SW4 are at a high level, whereby the signals each corresponding to two rows are sequentially output to a horizontal signal line 570.

Next, a gain that the signal is multiplied by will be explained. Let the signal from the pixel of row n held in the sampling capacitors 200as and 200bs be $\Delta V_{sn}$ and the signal from the pixel of row n+1 held in the sampling capacitors 200cs and 200ds be $\Delta V_{sn+1}$. Then a voltage $\Delta Vs2$ of the second vertical signal line 620s during the period "addition" is given by the following.

$$\Delta Vs2=\{(Csp/3+Csp/6)\times(C0/Cf)\times\Delta V_{sn}+(Csp/3+Csp/6)\times(C0/Cf)\times\Delta V_{sn+1}\}/\{2\times(Csp/3+Csp/6)\}=(C0/Cf)\times(\Delta V_{sn}+\Delta V_{sn+1})/2 \quad (16)$$

A voltage $\Delta Vn2$ appearing on the third vertical signal line 620n is given by a similar expression, and the output terminal OUT outputs a signal in which the output offset of the column amplifier unit Amp has been reduced. In other words, a voltage Vout2 output from the output terminal OUT of the differential amplifier 690 is given by the following.

$$Vout2=\{Csp/(Csp+Ccom)\}\times(Co/Cf)\times\Delta Vs2-\{Csp/(Csp+Ccom)\}\times(Co/Cf)\times\Delta Vn2=\{Csp/(Csp+Ccom)\}\times(Co/Cf)\times(\Delta Vs2-\Delta Vn2) \quad (17)$$

Three-Row Addition Mode

Next, an operation mode for adding signals from three rows will be described.

Figure 14:
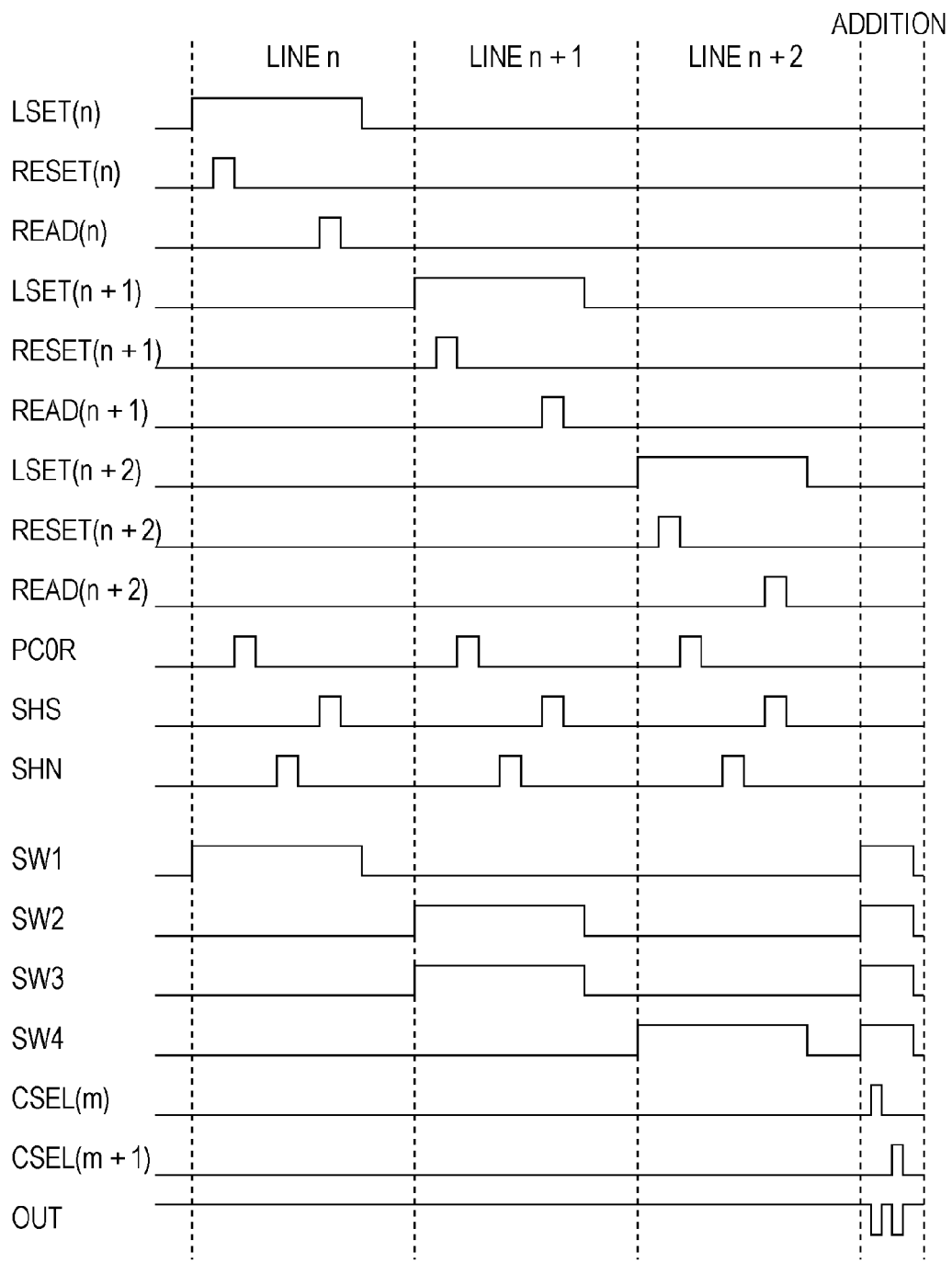
FIG. 14 is a timing diagram showing an example of driving timing according to the third embodiment.

FIG. 14 shows an exemplary driving pattern in the three-row addition mode in each column. Here, operations different from those in the all-pixel reading mode shown in FIG. 12 will be described. In the all-pixel reading mode, the sampling capacitors 200an to 200dn are treated as one capacitor, and the sampling capacitors 200as to 200ds are treated as one capacitor. However, the three-row addition mode is different from the all-pixel reading mode in that the sampling capacitors 200an to 200dn are utilized by being divided into three groups and the sampling capacitors 200as to 200ds are utilized by being divided into three groups.

In the period "row n" shown in FIG. 14, the signals SW2, SW3 and SW4 are kept at a low level, whereby the signal from the pixel of row n is held only in the sampling capacitor 200as. In the period "row n+1", the signals SW1 and SW4 are kept at a low level, whereby the signal from the pixel of row n+1 is held in the sampling capacitors 200bs and 200cs. Further, during a period "row n+2", since the signals SW1, SW2 and SW3 are kept at a low level, the signal from the pixel of row n+2 is held in the sampling capacitors 200ds. In other words, the signals from the pixels of rows n to n+2 are respectively held in capacitors having the same capacitance value Csp/3.

During the period "addition" following the period "row n+2", the signals SW1 to SW4 become a high level at the same time, whereby the sampling capacitors 200as to 200ds are electrically connected. Consequently, the signal from the pixel of row n held in the sampling capacitor 200a, the signal from the pixel of row n+1 held in the sampling capacitors 200bs and 200cs, and the signal from the pixel of row n+2 held in the sampling capacitor 200ds are added.

Then the signals CSEL are sequentially supplied while the signals SW1 to SW4 are at a high level, whereby the signals each corresponding to three rows are sequentially output to the horizontal signal line 570s.

Next, a gain that the signal is multiplied by will be explained. Let the signal from the pixel of row n held in the sampling capacitors 200as be $\Delta V_{sn}$ and the signal from the pixel of row n+1 held in the sampling capacitors 200bs and 200cs be $\Delta V_{sn+1}$. Similarly let the signal from the pixel of row n+2 held in the sampling capacitor 200ds be $\Delta V_{sn+2}$. Then the voltage $\Delta Vs3$ of the second vertical signal line 620s during the period "addition" is given by the following.

$$\Delta Vs3=\{(Csp/3)\times(C0/Cf)\times\Delta V_{sn}+(Csp/6+Csp/6)\times(C0/Cf)\times\Delta V_{sn+1}+(Csp/3)\times(C0/Cf)\times\Delta V_{sn+2}\}/\{3\times(Csp/3)\}=(C0/Cf)\times(\Delta V_{sn}+\Delta V_{sn+1}+\Delta V_{sn+2})/3 \quad (18)$$

This corresponds to averaging of the signals from the pixels corresponding to three rows. The voltage $\Delta Vn3$ of the third vertical signal line 620n is given by a similar expression, and the output terminal OUT of the differential amplifier 690 outputs a signal in which the output offset of the column amplifier unit Amp has been reduced. In other words, a voltage Vout3 output from, the output terminal OUT of the differential amplifier 690 is given by the following.

$$Vout3=\{Csp/(Csp+Ccom)\}\times(Co/Cf)\times\Delta Vs3-\{Csp/(Csp+Ccom)\}\times(Co/Cf)\times\Delta Vn3=\{Csp/(Csp+Ccom)\}\times(Co/Cf)\times(\Delta Vs3-\Delta Vn3) \quad (19)$$

As can be seen from Equations (15), (17), and (19), the gain for the voltage ΔV3 appearing on the second vertical signal line 620 is {Csp/(Csp+Ccom)}×(C0/Cf), which is the same as those in the all-pixel reading mode and two-row addition mode. In other words, in a solid-state image pickup apparatus having different addition modes, such as a two-row addition mode and a three-row addition mode, the same gain is realized for the different addition modes. Consequently, the issue in the known technique is solved, and a decrease in the S/N ratio at the time of addition is suppressed, while suppressing an increase in the chip size. Further, according to the present embodiment, since the column amplifier unit Amp is provided, amplification can be performed with a gain determined by the ratio of the clamp capacitor 610 and the feedback capacitor 680. In the first and second embodiments, in which a gain of the ratio Ccp/Csp is applied between the clamp capacitor 610 and the respective sampling capacitors 200, the signal becomes smaller, since the capacitance value of the sampling capacitor is generally set to a value larger than the capacitance value of the clamp capacitor. On the other hand, since the capacitance value of the feedback capacitor is set to a value smaller than the capacitance value of the clamp capacitor, the signal can be amplified with a gain of C0/Cf.

An example having a two-row addition mode and a three-row addition mode has been described above; however, the number of pixels to be added in addition modes is not limited to this. Generalization by using an aa-row addition mode and a bb-row addition mode, as explained in the first embodiment, may of course be employed.

As explained in the second embodiment, a configuration which allows for column weighted addition may of course be employed.

According to the embodiment described above, it is possible to suppress a decrease in the S/N ratio during addition while suppressing an increase in the chip area.

Figure 15:
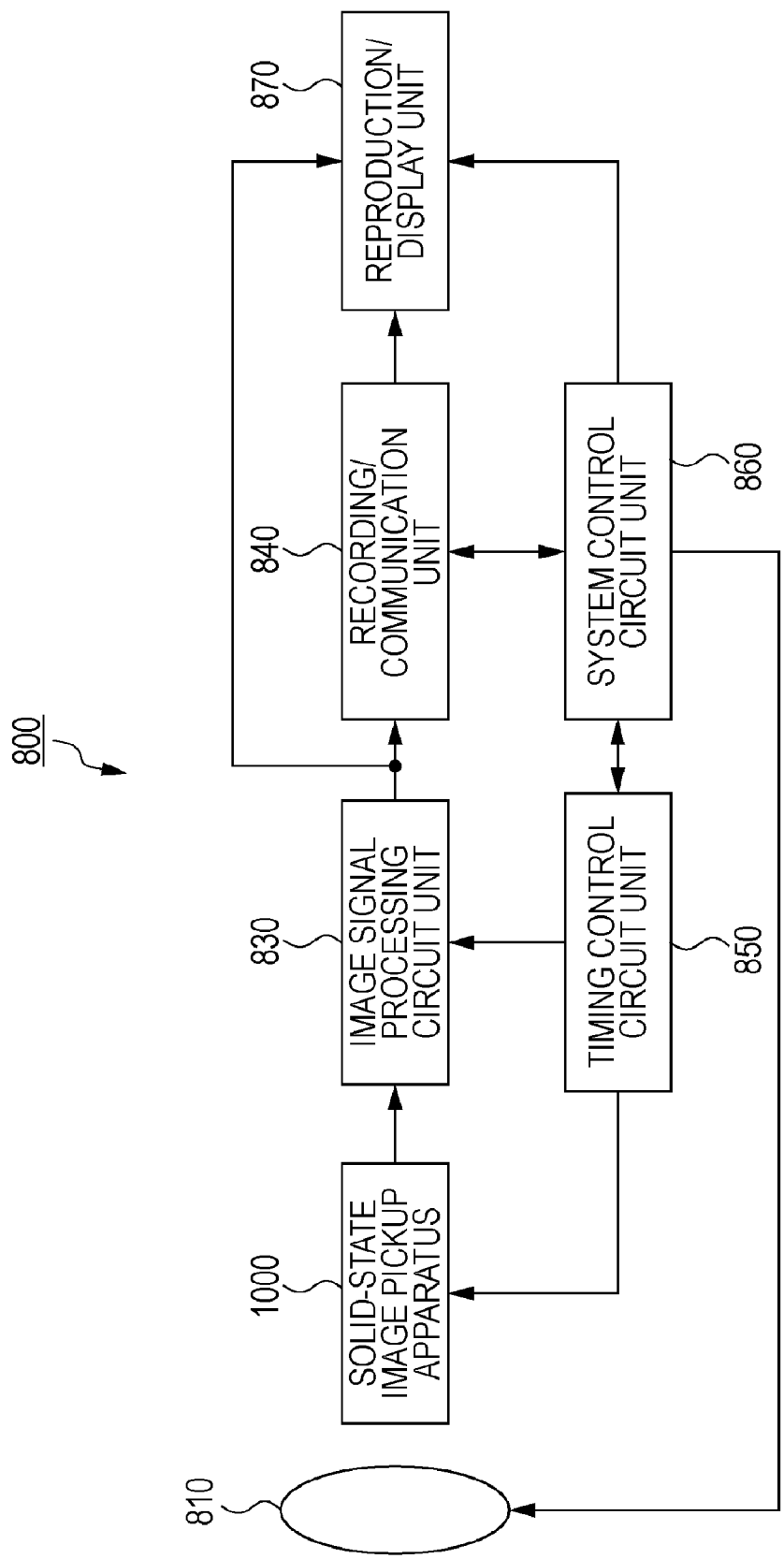
FIG. 15 is an illustration showing an example configuration of an image pickup system according to a fourth embodiment of the present invention.

An overview of an image pickup system according to the present embodiments will now be explained as a fourth embodiment with reference to FIG. 15.

An image pickup system 800 includes, for example, an optical unit 810, a solid-state image pickup apparatus 1000, an image signal processing circuit unit 830, a recording/communication unit 840, a timing control circuit unit 850, a system control circuit unit 860, and a reproduction/display unit 870.

The optical unit 810, functioning as an optical system such as a lens, causes light from an object to form an image in a pixel portion, a two-dimensional array of a plurality of pixels, of the solid-state image pickup apparatus 1000. The pixel portion includes the valid pixel area described above. The solid-state image pickup apparatus 1000 outputs a signal in accordance with the light of the image formed on the pixel portion, on the basis of the timing of a signal from the timing control circuit unit 850.

The signal output from the solid-state image pickup apparatus 1000 is input to the image signal processing circuit unit 830 functioning as an image signal processing unit, and is subjected to processing such as AD conversion performed by the image signal processing circuit unit 830 in accordance with a method defined by a program etc. The signal obtained by the processing in the image signal processing circuit unit 830 is sent to the recording/communication unit 840 as image data. The recording/communication unit 840 sends a signal for forming an image to the reproduction/display unit 870, to cause the reproduction/display unit 870 to reproduce and display a movie or a still image. The recording/communication unit 840 also communicates with the system control circuit unit 860 in response to the signal from the image signal processing circuit unit 830, and performs an operation of recording the signal for forming an image on a recording medium (not shown).

The system control circuit unit 860 performs overall control of the image pickup system 800, and controls the optical unit 810, the timing control circuit unit 850, the recording/communication unit 840, and driving of the reproduction/display unit 870. The system control circuit unit 860 is provided with a storage device (not shown) functioning as a recording medium, which records a program and the like necessary for controlling the operation of the image pickup system 800. The system control circuit unit 860 also supplies a signal for switching a driving mode in the image pickup system 800 in accordance with an operation etc. of a user.

The timing control circuit unit 850 controls the driving timing of the solid-state image pickup apparatus 1000 and the image signal processing circuit unit 830 on the basis of the control performed by the system control circuit unit 860 functioning as a control unit.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-241013 filed Sep. 19, 2008, which is hereby incorporated by reference herein in its entirety.

What is claimed is:

1. A solid-state image pickup apparatus, comprising:
   a plurality of pixels;
   a reading unit to which the plurality of the pixels are connected and which holds signals from the pixels; and
   a control unit capable of controlling operations of the plurality of the pixels and the reading unit,
   wherein the control unit controls the plurality of the pixels and the reading unit in a first operation mode in which addition is not performed, in a second operation mode in which signals from aa of the plurality of the pixels are added, aa being an integer greater than one, and in a third operation mode in which signals from bb of the plurality of the pixels are added, bb being an integer greater than aa, and bb is not a multiple of aa,
   wherein the reading unit includes a holding unit having a capacitance value of C,
   wherein the holding unit includes a first capacitor having a capacitance value of C/bb and a second capacitor having a capacitance value of C/p, p being a common multiple of aa and bb,
   wherein the control unit, in the second operation mode, controls the first and second capacitors such that groups each constituted of one of the first capacitors and one or more of the second capacitors or constituted of a plurality of the second capacitors so that each of the groups has a capacitance value of C/aa, and the control unit causes the groups to each hold the respective signal from the pixel, and
   wherein the control unit, in the third operation mode, causes groups each constituted of p/bb of the second capacitors to each hold the respective signal from the pixel and causes the first capacitors to each hold the respective signal from the pixel.

2. The solid-state image pickup apparatus according to claim 1,
   wherein aa and bb are relatively prime, and
   wherein the holding unit includes aa of the first capacitors and (bb−aa)×aa of the second capacitors.

3. The solid-state image pickup apparatus according to claim 2,
wherein the control unit, in the second operation mode, causes groups each constituted of one of the first capacitors and (bb−aa) of the second capacitors to each hold the respective signal from the pixel, and
wherein the control unit, in the third operation mode, causes groups each constituted of aa of the second capacitors to each hold the respective signal from the pixel and causes each of the first capacitors to hold the respective signal from the pixel.

4. The solid-state image pickup apparatus according to claim 1,
wherein aa is given by aa =m×c, and bb is given by bb =n×c, c, m, n, and r being integers and n ≠r×m, and
wherein the holding unit includes aa of the first capacitors and (bb−aa)×m of the second capacitors.

5. The solid-state image pickup apparatus according to claim 4,
wherein the control unit, in the second operation mode causes groups each constituted of one of the first capacitors and (n−m) of the second capacitors to each hold the respective signal from the pixel, and
wherein the control unit, in the third operation mode, causes the first capacitors and groups each constituted of m of the second capacitors to each hold the respective signal from the pixel.

6. The solid-state image pickup apparatus according to any one of claims 1 to 5,
wherein the plurality of the pixels are arranged in a matrix, and
wherein the reading unit is provided for each column of the plurality of the pixels.

7. The solid-state image pickup apparatus according to claim 6, wherein the reading unit includes a connection unit configured to electrically connect the holding units provided in correspondence with the columns to one another.

8. An image pickup system, comprising;
the solid-state image pickup apparatus according to claim 1 further comprising
an optical system configured to form an image in a pixel unit of the solid-state image pickup apparatus; and
an iamge signal processing unit configured to process a signal output from the solid-state image pickup apparatus and generate image data.

* * * * *